United States Patent [19]

McWilliams et al.

[11] Patent Number: 5,303,878
[45] Date of Patent: Apr. 19, 1994

[54] METHOD AND APPARATUS FOR TRACKING AN AIMPOINT ON AN ELONGATE STRUCTURE

[75] Inventors: Joel K. McWilliams, Highland Village; Don R. Van Rheeden, Lewisville, both of Tex.

[73] Assignee: Texas Instruments Incorporated, Dallas, Tex.

[21] Appl. No.: 752,740

[22] Filed: Aug. 30, 1991

[51] Int. Cl.$^5$ .............................................. F41G 7/30
[52] U.S. Cl. ...................................... 244/3.15; 382/1
[58] Field of Search ................. 382/1, 48; 244/3.15, 244/3.16; 250/203.1

[56] References Cited

U.S. PATENT DOCUMENTS

| | | | |
|---|---|---|---|
| 4,868,871 | 9/1989 | Watson et al. | 382/1 |
| 5,211,356 | 5/1993 | McWilliams et al. | 244/3.15 |
| 5,213,281 | 5/1993 | McWilliams et al. | 244/3.15 |

OTHER PUBLICATIONS

Blackman, Multiple-Target Tracking with Radar Applications, Artech House Inc. pp. 309-328, 1986.
Huber, Robust Statistics, John Wiley & Sons, Inc. pp. 107-108, 1981.
Liu, "New Image Tracking Algorithm for Fuzzy-Relaxation Matching of Point Patterns", Hongwai Yanjiu, vol. 8, No. 5, 1989, pp. 349-354.
Mao, "Image Sequence Processing for Target Estimation in Forward-Looking Infrared Imagery" Optical Engineering, vol. 27, No. 7, pp. 541-549, Jul. 1988.
Hayman, "Design and Simulation of an Intelligent Missile Seeker," (origin date of article unknown).
Texas Instruments Inc., Defense Systems and Electronic Groups "Software Functional Specification for Image Tracking of the Autonomous Guidence for Conventional Weapons Technical Expert", 3183-S-0008, Aug. 15, 1989, vol. 6 of 15, Rev. B. Aug. 24, 1990 (prepared for Dept. of the Air Force).
A Collection of Presentation Materials Prepared by the Applicants on Jun. 26, 1991, for Presentation to the U.S. Army Technical Staff.

*Primary Examiner*—Ian J. Lobo
*Attorney, Agent, or Firm*—Rene' E. Grossman; Richard L. Donaldson

[57] ABSTRACT

A method is disclosed for tracking an aimpoint on an elongate target with a set of arbitrarily related subimages in the field of view of the tracker. A dimensional relationship between the subimages and the aimpoint is initially determined and saved for later calculations. Subsequently, at least one of the aimpoints is reacquired. The aimpoint at the subsequent time is then determined using the position of the later acquired subimage, the saved dimensional relationship and indirectly on the position of the subimage in the field of view of the tracker.

7 Claims, 2 Drawing Sheets

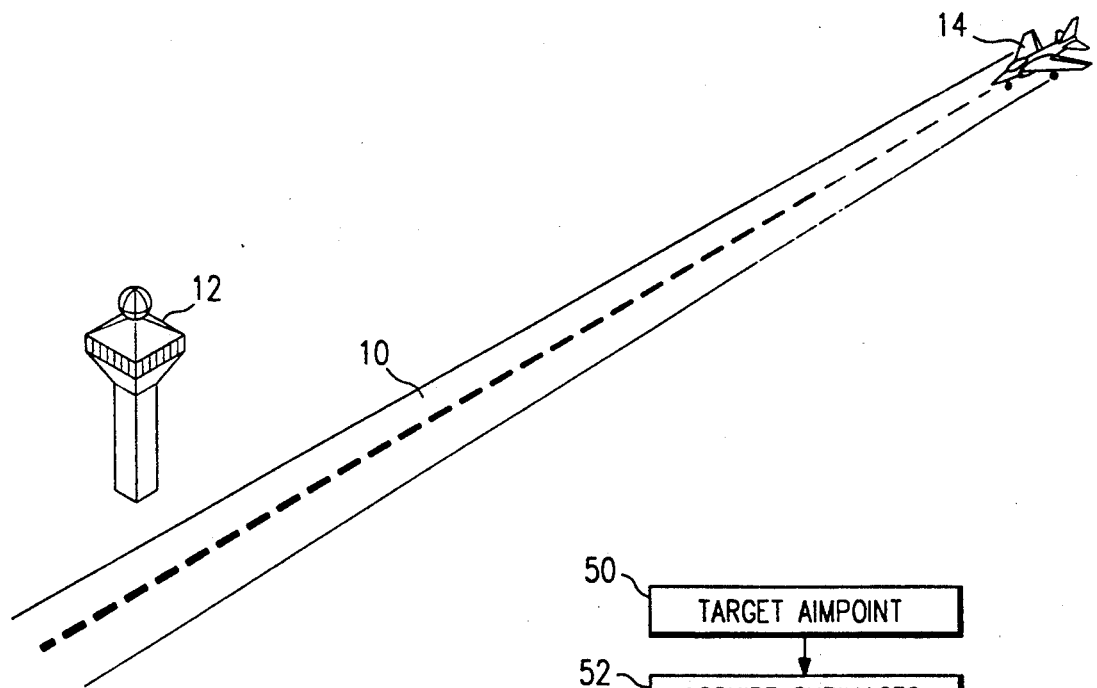
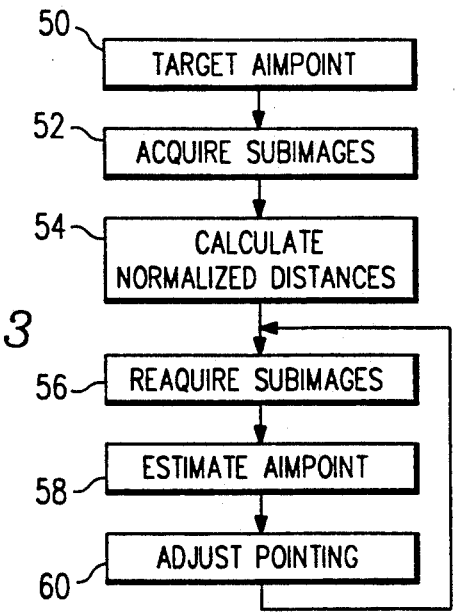
FIG. 3
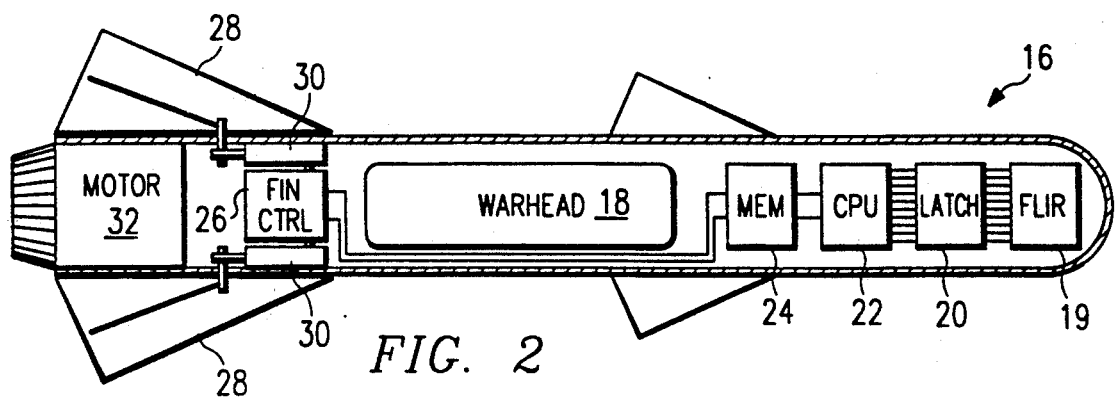
FIG. 2

METHOD AND APPARATUS FOR TRACKING AN AIMPOINT ON AN ELONGATE STRUCTURE

RELATED APPLICATIONS

This Application is related to U.S. Pat. No. 5,211,356, filed Aug. 30, 1991, entitled "Method and Apparatus for Rejecting Aimpoint Subimages", and is incorporated by reference herein.

This Application is related to U.S. Pat. No. 5,213,281, filed Aug. 30, 1991, entitled "Method for Tracking an Aimpoint with Arbitrary Subimages", and is incorporated by reference herein.

TECHNICAL FIELD OF THE INVENTION

This invention relates to imaging and guidance systems and more particularly to tracking an aimpoint on an elongate structure with arbitrary subimages.

BACKGROUND OF THE INVENTION

In certain computer control applications, it is necessary to track and measure the image of an object passively. It is especially important in weapons delivery systems that a target be so tracked. If such a target were tracked actively, (i.e., using radar or laser range finding techniques) the target might detect the presence of the tracker. Once the target has detected the presence of the tracker, it can respond in one of several ways, all of which are deleterious to the tracker. For instance, the target might "jam" the tracker by bombarding it with signals that are comparable to those which the tracker is actively using or the target might fire its own weapon at the tracker, at the source of the tracking signal, or, even at the launching site of the tracker. In this way, the target could defeat the tracker, destroy the tracker or perhaps even destroy the launch site of the tracker, including the operating personnel.

Passively tracking a target, however, imposes at least one serious limitation on the tracker. A tracker cannot accurately determine the distance or "range" to a target if it cannot actively sense the object. An active tracker, for instance, could determine the distance to a target by measuring the elapsed time from the emission of a radio frequency signal to the receipt of the signal reflected off of the target. The absence of a range measurement from tracker to target limits the passive tracker's ability to compensate for the apparent change in target image as the tracker moves in relationship to the target. Without this ability, a tracker will fail to maintain a constant target.

In practice, a tracker benefits by tracking several subimages of its target's image. These subimages are two dimensional representations of structures that are physically connected to the exact target location or "aimpoint" in the real three-dimensional world. Multiple subimages are used for redundancy purposes and because the actual aimpoint of the target is often untrackable. As the tracker nears the target, however, the subimages will appear to move with the respect to each other. The position of the subimages with respect to one another may also change in certain situations. For instance, two subimages located on a target may appear to approach one another if they are located on a face of a target that is rotating away from the tracker. A tracker targeting an elongate structure such as a runway or tall building will sense complex subimage motion due to closure of the tracker on the target. Certain subimages will appear to move at rates that are dependent on the location of the subimage within the tracker's field of view.

Prior attempts to passively track an object have resulted in solutions with limited flexibility and poor accuracy. Heretofore, an object once identified as an aimpoint was tracked by tracking a predetermined number of subimages in a known pattern. Typically, the pattern chosen was a square with the aimpoint at its center and four subimages located at the four corners of the square. That system would track the four subimages located at the corners of the square and infer the actual aimpoint using the simple symmetry of the predetermined square. This method faltered when the geometry of the actual target resulted in less than four suitable subimages located in the requisite pattern. This system also lacked the ability to use trackable subimages that were not in the requisite pattern.

Therefore, a need has arisen for a passive subimage tracker which is able to track an aimpoint or an elongate target by using any number of subimages arbitrarily related to the aimpoint without range data.

SUMMARY OF THE INVENTION

In accordance with the present invention, a method for tracking an aimpoint is provided which substantially eliminates or reduces disadvantages and problems associated with prior trackers.

A method for tracking an aimpoint on an elongate target comprises the steps of acquiring an aimpoint and a set of subimages in the tracker's field of view. The subimages may be arbitrarily associated with the aimpoint. A normalized distance from each subimage to the aimpoint is calculated for use at a later time when at least one of the subimages is reacquired. Each subsequent location of the aimpoint is estimated based on the subsequent location of the subimages, on the position of the subimages in the field of view, and on the saved normalized distances.

It is a technical advantage of the invention that an aimpoint located on an elongate target may be tracked without range data using subimages that are arbitrarily related to the aimpoint. A normalized distance from the aimpoint to each subimage is calculated at an initial time and saved for subsequent steps. At each subsequent time, a vector is calculated which maintains the same normalized distance from each subimage to the aimpoint. The subsequent location of the aimpoint may be maintained despite apparent movement of the subimages due to uniform and non-uniform magnification due to closure.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a perspective view of an elongate target which may be tracked by the disclosed invention;

FIG. 2 is a part schematic, part cross-sectional diagram of a "fire and forget" missile which may incorporate the disclosed invention;

FIG. 3 is a flow chart of a subimage tracker which incorporates the disclosed invention;

DETAILED DESCRIPTION OF THE INVENTION

Figure 4:
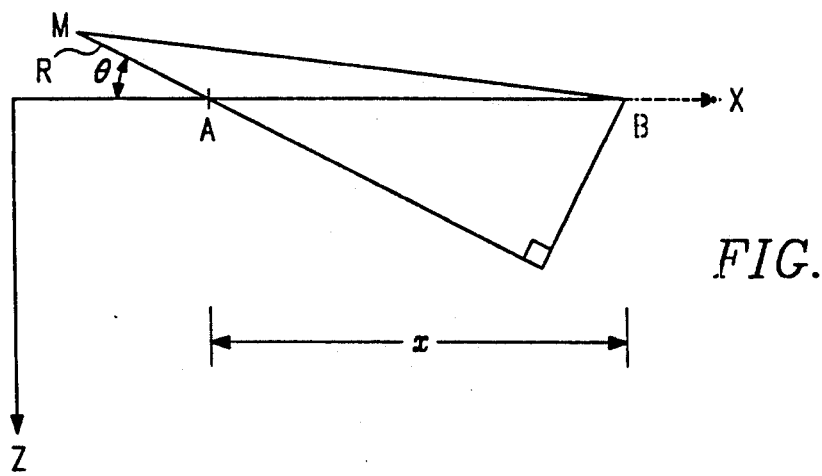
FIGS. 4 and 5 are one and two-dimensional models, respectively, of a tracker targeting an aimpoint with one subimage on an elongate object.

The preferred embodiment of the present invention and its advantages are best understood by referring to FIGS. 1 through 6 of the drawings like numerals being used for like and corresponding parts of the various drawings.

FIG. 1 depicts an elongate target 10, Here target 10 is a runway but might also be a bridge, a train or a building relatively large in the horizontal dimension as compared to the vertical. An operator of the tracker, or an automatic algorithm, initially selects an aimpoint on runway 10 such as its geometric center. A tracker targeting runway 10 then acquires trackable subimages such as control tower 12 or airplane 14 from which it can track the center of the runway 10. The tracker then determines range normalized distances from each subimage to the designated aimpoint and saves these values for future calculations. This distance may be the actual number of pixels between the aimpoint and a subimage as sensed by the tracker's sensor or may be further normalized so that at least one subimage is a particular distance, such as "1", away from the aimpoint.

The tracker reacquires the subimages at subsequent times and uses the range normalized distances and a mathematical model as will be explained in connection with FIGS. 3 through 6 throughout to estimate the location of the aimpoint at those subsequent times. If the tracker is part of a device such as a "fire and forget" missile, it will continually adjust its course to intercept the initial aimpoint until it reaches the aimpoint.

As the tracker approaches runway 10, the subimages of runway 10 will exhibit complex motion relative to one another. This motion may be characterized as comprising a uniform and a non-uniform component. The uniform component of motion will cause the subimages to radially move away from the aimpoint as the tracker nears the aimpoint and the target image fills more and more of the tracker's field of view. The non-uniform component causes each subimage to move depending on its location in the field of view of the sensor. For instance, if a tracker targets an aimpoint on runway 10 between control tower 12 and airplane 14 and approaches runway 10 along its longitudinal axis from the left side of the figure, control tower 12 will appear to move toward the bottom of the field of view at one rate while airplane 14 will appear to move toward the top at a much smaller rate. Without accounting for the non-uniformities, the aimpoint would likely slide from the true aimpoint toward the bottom of the field of view as the tracker attempted to find a compromise position between control tower 12 and airplane 14. The compromise position would be one that would make the magnification of the subimages appear equal along the length of runway 10.

FIG. 2 depicts a "fire and forget" missile 16 which may incorporate the disclosed invention. Missile 16 delivers a warhead 18 which detonates upon impact with a target. The missile 16 contains a passive imaging sensor 19, such as a forward looking infrared camera ("FLIR"), that is sensitive to radiation emitted by the missile's target. The sensor 19 periodically acquires images within its field of view during operation. A latch 20 temporarily saves the information received by sensor 18 so that it is more accessible by central processing unit ("CPU") 22. CPU 22 might itself comprise various subsystems (not shown) which may be implemented by hardware or software, including an aimpoint designator for initially establishing the aimpoint on the target and a normalized distance calculator for calculating the distance between each subimage and the aimpoint. CPU 22 has associated with it a memory 24. Memory 24 may contain the routines which CPU 22 runs and stores data necessary to the disclosed invention. CPU 22 controls the direction of missile 16 through fin control unit 26. Fin control unit 26 manipulates each fin 28 through a servo 30. Missile 16 is propelled by rocket motor 32.

FIG. 3 depicts a high level flow chart of a subimage tracker which incorporates the disclosed invention. An aimpoint is initially selected on the target in block 50 by an operator. The tracker then acquires multiple subimages associated with the chosen aimpoint according to internal criteria such as image contrast or image brightness (block 52). The tracker calculates the normalized distances between each subimage that it has acquired and the selected aimpoint in block 54. These values are saved for later use at each subsequent time, the tracker reacquires the subimages and estimates the location of the aimpoint from the previously calculated normalized distances in blocks 56 and 58 respectively. The math and the particular normalized distances are more fully described below. The tracker may then adjust sensor pointry (block 60) to maintain the aimpoint at the center of its field of view. These final three steps are repeated until the missile impacts its target or the tracker otherwise ends its program.

It should be understood that block 60 may comprise any number of related steps such as issuing commands to an operator to follow the aimpoint or displaying crosshairs to pinpoint the location of the aimpoint in a display. The tracker may also be mounted in a stationary environment where it simply follows an aimpoint in its field of view without actively pursuing the target. The imager could, in fact, recede from the target and the tracker would still maintain the aimpoint properly.

The approach to multiple subimage tracking without range estimates is based on a generalized geometric model. This model is based on the assumption that though the target and thus the subimages will be growing in the image during closure, the relative dimensions of the target do not change. This assumes that the angle of attack between the tracker and target stays fairly constant, which is common during most of the terminal phase of the missile flight.

In the generalized geometric approach each tracker location is related to the aimpoint location using a normalized coordinate frame. An individual subimage i at image location $(x_i, y_i)$ can be related to the aimpoint A at image location $(x_A, y_A)$ by the following equations:

$$x_i = x_A + d_{xi} + n_{xi}$$

$$y_i = y_A + d_{yi} + n_{yi}$$

where $(d_{xi}, d_{yi})$ represents the offset in the image plane of subimage i from the aimpoint A, and $(n_{xi}, n_{yi})$ are additive noise terms which corrupt measurement of the true subimage location. These equations can be combined into a single equation using vector notation:

$$\underline{x} = \underline{x}_A d\underline{x} + \underline{n}$$

The key to accurately modeling each subimage position is the accurate determination of how the offset vector varies as a tracker approaches an elongate target.

FIG. 4 depicts the mathematical framework for determining the offset vector related to an elongate target in a two-dimensional universe, the vertical plane through the missile and the aimpoint. Here an aimpoint A is downrange of and below a missile "M" by a distance "R". A trackable subimage is located at B. B is further downrange of A by a distance "x". For a large distance R relative to x, the angle between the subimage, missile and aimpoint may be expressed as:

$$d_y = \frac{x \sin \Theta}{R + x \cos \Theta}$$

This angle is distance from the aimpoint to the subimage which a tracker actually "sees" when it acquires an image. (In FIG. 4 R is shown as on the same order of magnitude as X for purposes of clarity.)

The vertical "magnification" of a subimage associated with an elongate target at a particular time may then be defined as:

$$M = \frac{d_y(R_1)}{d_y(R_0)}$$

where $d_y(R_0)$ is the distance between the subimage and aimpoint at an initial range of $R_0$ and $d_y(R_1)$ is the distance between the subimage and aimpoint at a subsequent range $R_1$. If the tracker is a missile designed to intercept the target, then $R_1$ will be less than $R_0$. The magnification M may be used to model the behavior of the subimages between successive times and thus, may be used to predict the subsequent position of the aimpoint. This model will be more fully described in connection with FIGS. 5 and 6.

Figure 5:
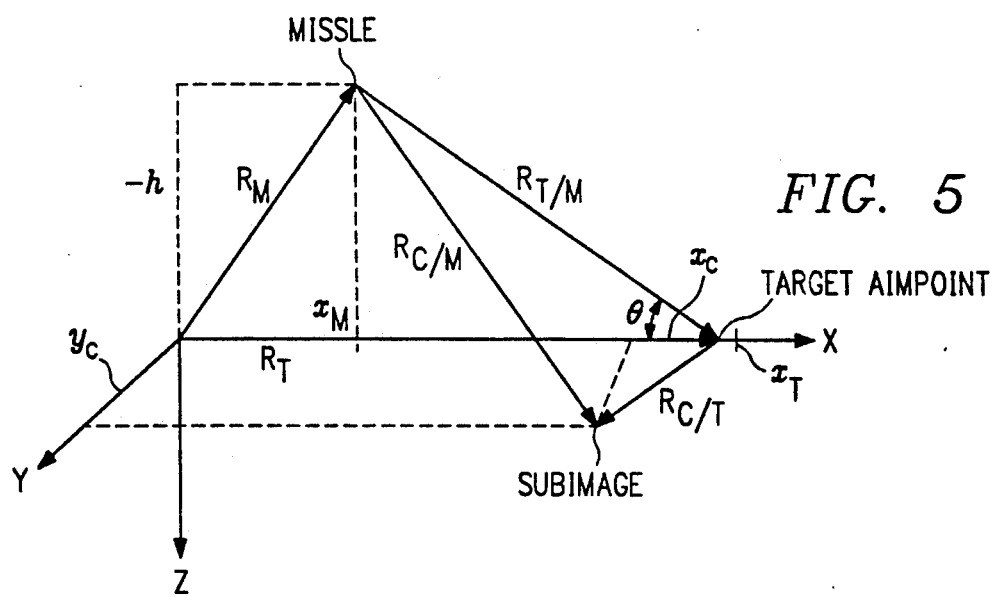

FIG. 5 depicts a mathematical framework for determining the offset vector of a subimage associated with an elongate target in a three-dimensional universe. The four vectors $R_M$, $R_T$, $R_{T/M}$ and $R_{C/T}$ may be expressed as:

$$R_M = \begin{pmatrix} x_M \\ 0 \\ -h \end{pmatrix}, R_T = \begin{pmatrix} x_T \\ 0 \\ 0 \end{pmatrix}, R_{T/M} = \begin{pmatrix} x_T - x_M \\ 0 \\ h \end{pmatrix}$$

$$R_{C/T} = \begin{pmatrix} x_C \\ y_C \\ 0 \end{pmatrix}$$

where X, Y and Z are positive in the directions indicated by the depicted coordinate system. The distances between the subimage and aimpoint are indicated as $x_c$ and $y_c$ for the X and Y dimensions respectively.

The coordinate system in FIG. 5 may be transformed to a platform ("(p)") coordinate system at the missile position through the transformation:

$$D = \begin{pmatrix} \cos\Theta & 0 & \sin\Theta \\ 0 & 1 & 0 \\ -\sin\Theta & 0 & \cos\Theta \end{pmatrix}$$

where $$\Theta = \tan^{-1}\left(\frac{h}{x_T - x_M}\right)$$

The vectors $R_{T/M}$ and $R_{C/M}$ may be transformed into the new coordinate system as:

$$R_{T/M(p)} = \begin{pmatrix} R_s \\ 0 \\ 0 \end{pmatrix} R_s = \sqrt{(x_T - x_M)^2 + h^2}$$

$$R_{C/M(p)} = \begin{pmatrix} R_s \\ 0 \\ 0 \end{pmatrix} + D\begin{pmatrix} x_C \\ y_C \\ 0 \end{pmatrix}$$

$$R_{C/M(p)} = \begin{pmatrix} R_s \\ 0 \\ 0 \end{pmatrix} + \begin{pmatrix} x_C \cos\Theta \\ y_C \\ -x_C \sin\Theta \end{pmatrix}$$

The vector $R_{C/M(p)}$ may be used to calculate the magnification function M as was done in connection with FIG. 4. The Y and Z platform components correspond to the distances between the subimage and the aimpoint in the platform coordinate system. These may be divided by the total platform downrange distance $R_s + x_C \cos\Theta$ to yield angular distances between aimpoint and subimage:

$$\begin{pmatrix} d_x \\ d_y \end{pmatrix} = \begin{pmatrix} \frac{y_C}{R_S + x_C \cos\Theta} \\ \frac{-x_C \sin\Theta}{R_S + x_C \cos\Theta} \end{pmatrix}$$

or rearranging, $$d_x R_s + d_x x_C \cos\Theta = y_C \text{ and } d_y R_s = -(d_y \cos\Theta + \sin\Theta)x_C$$

The distances $d_x$ and $d_y$ correspond to the distances between the aimpoint and the subimage in the horizontal and vertical axes of the image plane of the passive sensor.

The distances $d_x$ and $d_y$ may be used to solve for ($x_C$, $y_C$) for a given geometry with the series of equations:

$$\begin{bmatrix} -d_x \cos\Theta & 1 \\ -d_y \cos\Theta - \sin\Theta & 0 \end{bmatrix} \begin{bmatrix} x_C \\ y_C \end{bmatrix} = \begin{bmatrix} d_x R_s \\ d_y R_s \end{bmatrix}$$

These equations, are used to create test cases for simulation of the tracker and to illustrate the results in the following paragraph.

Figure 6:
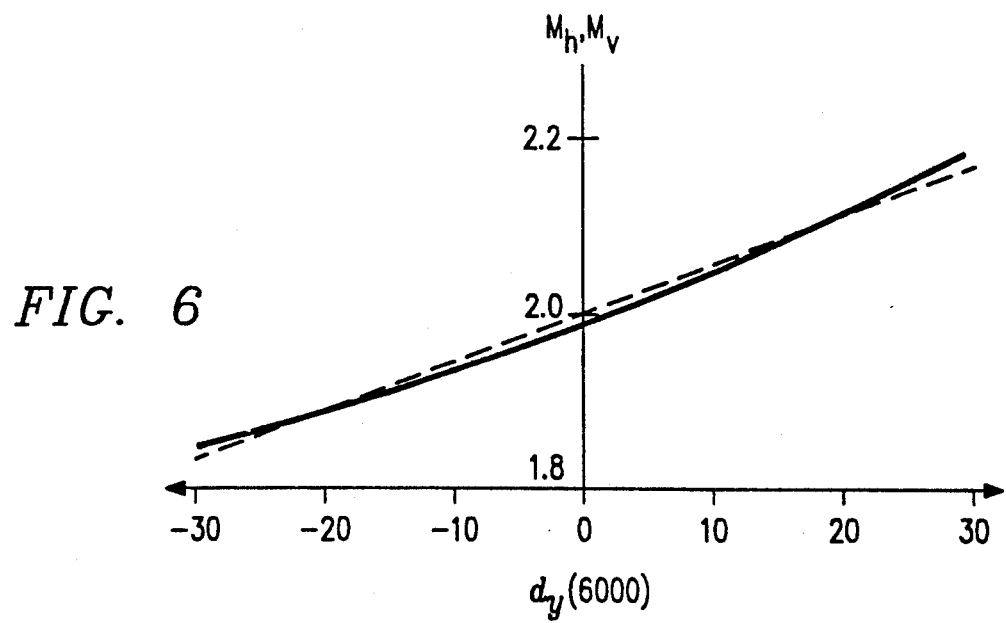
FIG. 6 depicts the magnification of a subimage as a function of its position in the tracker's field of view.

FIG. 6 depicts the magnification versus vertical image position for one particular geometry. Specifically, the solution is depicted in terms of $M_H$ and $M_v$ as a function of $d_y(6000)$ where $M_H = d_x(R_1)/d_x(R_o)$, $M_v = d_y(R_1)/d_y(R_o)$, $R_1 = 3,000$ and $R_o = 6,000$. The solution indicates that $M_H$ and $M_v$ are identical and are closely related to $d_y(R_0)$ by an equation having the form of a line, $M_0 + b d_y(R_0)$. $M_0$ are b are constants. Combining these empirical results with the general equations:

$$x_i = x_A + d_{xi} + n_{xi}$$

$$y_i = y_A + d_{yi} + n_{yi}$$

leads to the set of equations for the location of the image of the ith subimage at each successive time:

$$x_i = x_A + M_H d_{xi}(R_0) + n_{xi}$$

$$y_i = y_A + M_V d_{yi}(R_0) + n_{yi}$$

or $$x_i = x_A + M_o d_{xi} + d_{yi} d_{xi} b + n_{xi}$$

$$y_i = y_A + M_o d_{yi} + d_{yi} d_{yi} b + n_{yi}$$

where $d_{xi}$ and $d_{yi}$ are understood to be determined when the aimpoint is first acquired. For N subimages, the above equations for one subimage may be expanded as:

$$\begin{bmatrix} x_1 \\ \cdot \\ \cdot \\ \cdot \\ x_N \\ y_1 \\ \cdot \\ \cdot \\ \cdot \\ y_N \end{bmatrix} = \begin{bmatrix} 1 & 0 & d_{x1} & d_{x1}d_{y1} \\ \cdot & \cdot & \cdot & \cdot \\ \cdot & \cdot & \cdot & \cdot \\ \cdot & \cdot & \cdot & \cdot \\ 1 & & d_{xN} & d_{xN}d_{yN} \\ 0 & 1 & d_{y1} & d_{y1}^2 \\ \cdot & \cdot & \cdot & \cdot \\ \cdot & \cdot & \cdot & \cdot \\ \cdot & \cdot & \cdot & \cdot \\ 0 & 1 & d_{yN} & d_{yN}^2 \end{bmatrix} \begin{bmatrix} x_A \\ y_A \\ M_0 \\ b \end{bmatrix} + \begin{bmatrix} n_{x1} \\ \cdot \\ \cdot \\ \cdot \\ n_{xN} \\ n_{y1} \\ \cdot \\ \cdot \\ \cdot \\ n_{yN} \end{bmatrix}$$

This equation itself can be more conveniently expressed as:

$$\underline{x} = H\theta + \underline{n}$$

where $\theta = [x_A \ y_A \ M_o \ b]^T$ and H is the 2N×4 matrix depicted above. At each successive time the tracker reacquires the subimages, all variables are known except those in $\theta$ and the noise vector $\underline{n}$.

The vector $\theta$ and hence the aimpoint may be estimated by several statistical methods, including a least squares technique:

$$\hat{\theta} = (H^T H)^{-1} H^T \underline{x}$$

where $\hat{\theta}$ is the estimate of $\theta$. This method will minimize the effect of the noise vector $\underline{n}$.

Sections A-G below contain FORTRAN computer code for one embodiment of the disclosed invention. In particular, Section A discloses subroutine TRKNORNG2D for computing the aimpoint using a single magnification model. Section B discloses Subroutine TRKNORNG for computing the location of the aimpoint using the dual magnification model. Section C discloses Subroutine INTJITTER for rejecting bad subimages associated with an aimpoint under the subroutine TRKNORNG2D. Section D discloses subroutine JITTER for rejecting bad subimages associated with an aimpoint under the subroutine TRKNORNG. Section E discloses Subroutine LEASTSQ for calculating the least-squares estimate of a parameter vector. Section F discloses the common block variable declarations TKPTPARM and PROCPARM for the previous subroutines. Section G discloses a library of subroutines useful primarily for matrix math called by subroutines TRKNORNG, TRKNORNG2D, INTJITTER, JITTER and LEASTSQ.

```
C      NOTICE: "COPYRIGHT 1991, (TEXAS INSTRUMENTS, INC.) A portion of
C      the disclosure of this patent document contains material which is subject
C      to copyright protection. The copyright owner has no objection to the
C      facsimile reproduction by anyone of the patent document or the patent
C      disclosure, as it appears in the Patent and Trademark Office patent file
C      or records, but otherwise reserves all copyright rights whatever."
C
C
C                                    Section A
C_____
C                                 Texas Instruments
C                              T I   I N T E R N A L   D A T A
C                              Property of Texas Instruments ONLY
C_____
C
C      SUBROUTINE TRKNORNG2D
C_____
C
C      NAME:          TRKNORNG2D
C
C      FUNCTION:      Computes the aimpoint and trackpoint when no range
C                     estimates are available. A least-square estimator
C                     calculates aimpoint and target magnification by
C                     assuming magnification is the same in each dimension.
C                     A single magnification factor is used.
C
C      DESCRIPTION:
C
```

```
C      Initialize the trackpoint measurement variances, the number of good
C              trackers, and the standard deviation for one tracker
C      Set the tracker mode to locked on and the breaklock flag to false
C
C      Do for all trackers
C          If a tracker is active and is at least one cycle old Then
C              Assign model matrices and observation vectors used to
C                  compute least-squares target aimpoint and size estimates
C              If weight trackers by distance from the aimpoint Then
C                  Assign X distance weights
C                  Assign Y distance weights
C              Else
C                  Assign all weights to unity
C              End of If weight trackers by distance from the aimpoint
C              Increment the number of trackers counter
C          Else this tracker is not active or at least one cycle old
C              Zero the least-squares weights for this tracker
C          End of If a tracker is active and at least 1 cycle old
C      End of Do for all trackers
C
C      If there are at least two valid trackers Then
C          Use least-squares to estimate aimpoint location and target size
C          Run the jitter test to delete trackers with bad measurements
C          Recompute the estimated trackpoint location and target size
C              after removing the bad measurements
C          Compute track errors and measurement variances
C          Update the aimpoint and trackpoint by adding in track errors
C          Save the estimated target sizes
C          Set the tracker mode to locked on
C      Else if there is one valid tracker Then
C          Find the tracker measurement of the good tracker
C          Compute the aimpoint as the offset from the tracker
C          Set the tracker mode to locked on
C      Else there are no valid trackers
C          Set the breaklock flag
C          Set the tracker mode to rate coast
C      End of If there are valid trackers
C
C  REFERENCES:
C
C  None
C
C
C  CALLING SEQUENCE:
C      CALL TRKNORNG2D
C
C  INPUTS:
C      None
C
C  OUTPUTS:
C      None
C
C  DEPENDENCIES:
C      Common Blocks
C          PROCPARMS      -   Processing parameters
C          TKPTPARMS      -   Trackpoint/aimpoint related parameters
C      Subroutines
C          INTJITTER      -   Integrating jitter test
C          LEASTSQ        -   Weighted least-squares estimator
C
```

```
C     SIDE EFFECTS:
C         None
C
C     TARGET PROCESSOR:
C         VAX 8000 series VMS 4.5, Fortran Compiler 4.5-219
C
C     HISTORY:
C         05/29/91  D. Van Rheeden  Initial Release
C
C_____
C
C     Local Variables
C
C     FACTOR       Normalized magnification factor
C     H            Least-squares model matrix
C     MAXEST       Maximum number of least-squares parameter estimates
C     MAXOBS       Maximum number of least-squares observations
C     NTRACKERS    Number of trackers whose errors are being averaged
C     P            Least-squares estimate covariance matrix
C     SIGMA        Measurement standard deviation of one tracker
C     TRACKER      Tracker index into data arrays
C     W            Least-squares weighting vector
C     XHAT         Least-squares estimate vector
C     Z            Least-squares observation vector
C     ZHAT         Least-squares estimates of tracker locations
C
C_____
C
C     Variable Declarations
C
      IMPLICIT NONE
C
      INCLUDE 'COMMON:PROCPARM.CMN'   ! Processing parameters
      INCLUDE 'COMMON:TKPTPARM.CMN'   ! Processing parameters
C
      INTEGER*2   MAXEST/3/, MAXOBS/24/, NTRACKERS,
     &            TRACKER
C
      REAL*4      FACTOR, H(24,3), P(3,3), SIGMA, W(24),
     &            XHAT(3), ZHAT(24), Z(24)
C
C_____
C                       EXECUTABLE CODE
C_____
C
C     Initialize the trackpoint measurement variances, the number of good
C     trackers, and the standard deviation for one tracker.
C
      TPVARX = 0.0
      TPVARY = 0.0
      NTRACKERS = 0.0
      SIGMA = 0.5
C
C     Set the tracker mode to locked on and the breaklock flag to false.
C
      TRKMODE = 1
      BRKLCK = .FALSE.
C
C     For each good tracker at least one cycle old...
C
      DO TRACKER = 1, MAXT
```

```
         IF (DBASE(TRACKER,1) .EQ. 2 .AND. DBASE(TRACKER,9) .GE. 1)
     &   THEN
C
C     Assign model matrices and observation vectors used to compute
C     least-squares target aimpoint and size estimates.
C
         H(TRACKER,1) = 1.0
         H(TRACKER,2) = 0.0
         H(TRACKER,3) = DIST2DX(TRACKER)
         H(TRACKER+MAXT,1) = 0.0
         H(TRACKER+MAXT,2) = 1.0
         H(TRACKER+MAXT,3) = DIST2DY(TRACKER)
C
         Z(TRACKER)       =    DBASE(TRACKER,2)
         Z(TRACKER+MAXT)  =    DBASE(TRACKER,3)
C
C     If selected, assign least-squares weights based on the distance of the
C     tracker from the aimpoint.
C
         IF (WEIGHTDIST) THEN
C
            IF (DISTX(TRACKER) .GT. 0.1) THEN
               W(TRACKER)= 1.0 / DISTX(TRACKER)
            ELSE
               W(TRACKER) = 10.0
            END IF ! X normalized distance > 0.1

IF (DISTY(TRACKER) .GT. 0.1) THEN
               W(TRACKER+MAXT) = 1.0 / DISTY(TRACKER)
            ELSE
               W(TRACKER+MAXT) = 10.0
            END IF ! Y normalized distance > 0.1
C
         ELSE ! Don't assign distance weights
C
            W(TRACKER)        = 1.0
            W(TRACKER+MAXT)   = 1.0
            END IF ! Assign distance weights
C
C     Increment the number of trackers counter.
C
            NTRACKERS = NTRACERS + 1
C
C     Else, zero the least-squares weights for this tracker.
C
         ELSE
            W(TRACKER)     = 0.0
            W(TRACKER+MAXT) = 0.0
         END IF ! This tracker is good and at least 1 cycle old
      End DO ! For all good trackers
C
C     If there are at least two trackers . . .
C
         IF (NTRACKERS .GT. 1) THEN
C
C     Use least-squares to estimate aimpoint location and target size.
C
            CALL LEASTSQ (H, Z, W, XHAT, ZHAT, P, MAXEST, MAXOBS)
C
C     Run the integrating jitter test to delete trackers with bad measurements.
C
         DO TRACKER = 1, MAXT
```

```
                PREDX(TRACKER) = ZHAT(TRACKER)
                PREDY(TRACKER) = ZHAT(TRACKER+MAXT)
            END DO
            CALL INTJITTER
C
C   Recompute the estimated trackpoint location and target size
C   after removing the bad measurements.
C
            DO TRACKER = 1, MAXT
                IF (DBASE(TRACKER,1) .EQ. -1) THEN
                    W(TRACKER) = 0.0
                    W(TRACKER+MAXT) = 0.0
                END IF ! A tracker is not valid.
            END DO ! For all trackers
            CALL LEASTSQ (H, Z, W, XHAT, ZHAT, P, MAXEST, MAXOBS)
C
C   Compute track errors and measurement variances.
C
            RESERRX = XHAT(1) - AIMX
            RESERRY = XHAT(2) - AIMY
            MAGNIFY = XHAT(3)
C
C
            TPVARX = SIGMA**2 * P(1,1)
            TPVARY = SIGMA**2 * P(2,2)
            MAGVAR = SIGMA**2 * P(3,3)
C
C   Compute the aimpoint and trackpoint.
C
            AIMX = XHAT (1)
            AIMY = XHAT (2)
C
            TRACKX = AIMX + MAGNIFY * OFFSETX
            TRACKY = AIMY + MAGNIFY * OFFSETY
C
C   Compute the estimated target sizes based on magnification.
C
            FACTOR = MAGNIFY / INITSIZEX
            RSIZEX = FACTOR * INITSIZEX
            RSIZEY = FACTOR * INITSIZEY
C
C   Else, if there is one tracker . . .
C
        ELSE IF (NTRACKERS .GT. 0) THEN
C
C   Find the tracker measurement of the good tracker.
C
            TRACKER = 1
            DO WHILE (W(TRACKER) .EQ. 0.0)
                TRACKER = TRACKER + 1
            END DO ! while searching for the good tracker measurement
C
C   Compute the aimpoint as the offset from the tracker.  Use the estimated
C   magnification from the previous tracker frame.
C
            RESERRX = (Z(TRACKER) - DIST2DX(TRACKER)*MAGNIFY) - AIMX
            RESERRY = (Z(TRACKER+MAXT)-DIST2DY(TRACKER)*MAGNIFY) - AIMY
            TPVARX = SIGMA**2
            TPVARY = SIGMA**2
C
            AIMX = AIMX + RESERRX
```

```
            AIMX = AIMY + RESERRY
            TRACKX = TRACKX + RESERRX
            TRACKY = TRACKY + RESERRY
C
C     Else, set the breaklock flag to true and tracker mode to rate coast.
C
        ELSE
            BRKLCK = .TRUE.
            TRKMODE = 0
        END IF ! There are any trackers
C
        RETURN
        END
C_____Section B_____
C
C                          Texas Instruments
C                          TI STRICTLY PRIVATE
C                      Property of Texas Instruments ONLY
C
C_____
C
C        SUBROUTINE TRKNORNG
C
C_____
C
C   NAME:      TRKNORNG
C
C   FUNCTION:  Computes the aimpoint and trackpoint when no range
C              estimates are available.  A least-squares estimator
C              calculates aimpoint and target size estimates.
C              Separate X and Y magnification factors are used.
C
C   DESCRIPTION:
C
C        Initialize the trackpoint measurement variances, the number of
C            good trackers, and the standard deviation for one tracker
C        Set the tracker mode to locked on and the breaklock flag to false
C
C        Do for all trackers
C            If a tracker is active and is at least one cycle old Then
C                Assign model matrices and observation vectors used to compute
C                    least-squares target aimpoint and size estimates
C                If weight trackers by distance from the aimpoint Then
C                    Assign X distance weights
C                    Assign Y distance weights
C                Else
C                    Assign all weights to unity
C                End of If weight trackers by distance from the aimpoint
C                Increment the number of trackers counter
C            Else this tracker is not active or at least one cycle old
C                Zero the least-squares weights for this tracker
C            End of If a tracker is active and at least 1 cycle old
C        End of Do for all trackers
C
C        If there are at least two valid trackers Then
C            Use least-squares to estimate trackpoint location and target size
C            Run the jitter test to delete trackers with bad measurements
C            Recompute the estimated trackpoint location and target size
C                after removing the bad measurements
C            Compute track errors and measurement variances
C            Update the aimpoint and trackpoint by adding in track errors
```

```
C          Save the estimated target sizes
C       Else if there is one valid tracker Then
C          Find the tracker measurement of the good tracker
C          Compute the aimpoint as the offset from the tracker
C       Else there are no valid trackers
C          Set the breaklock flag to true
C          Set the tracker mode to rate coast
C       End of If there are valid trackers
C
C    REFERENCES:
C       None
C
C    CALLING SEQUENCE:
C       Call TRKNORNG
C
C    INPUTS:
C       None
C
C    OUTPUTS:
C       None
C
C    DEPENDENCIES:
C       Common Blocks
C          PROCPARMS - Processing parameters
C          TKPTPARMS - Trackpoint/aimpoint related parameters
C       Subroutines
C          LEASETSQ - Weighted least-squares estimator
C          JITTER -   Robust JITTER test
C
C    SIDE EFFECTS:
C       None
C
C    TARGET PROCESSOR:
C       VAX 8000 Series VMS 4.5, Fortran Compiler 4.5-219
C
C    HISTORY:
C       05/29/91    D. Van Rheeden Initial Release
C       07/29/91    D. Van Rheeden Added subpixel estimates
C
C_____
C
C    Local Variables
C       HX, HY            Least-squares model matrices
C       MAXEST            Maximum number of least-squares parameter estimates
C       MAXOBS            Maximum number of least-squares observations
C       NTRACKERS         Number of trackers whose errors are being averaged
C       PX, PY            Least-squares estimate covariance matrices
C       SIGMA             Measurement standard deviation of one tracker
C       SUMWX, SUMWY      Sum of weight values
C       TRACKER           Tracker index into data arrays
C       WX, WY            Least-squares weighting vectors
C       XHAT, YHAT        Least-squares estimate vectors
C       ZX, ZY            Least-squares observation vectors
C       ZXHAT, ZYHAT      Least-squares predicted observation vectors
C
C_____
C
C    Variable Declarations
C
        IMPLICIT NONE
C
```

```
           INCLUDE 'COMMON:PROCPARM.CMN'    ! Processing parameters
           INCLUDE 'COMMON:TKPTPARM.CMN'    ! Trackpoint parameters
C
C          INTEGER      MAXEST/2/, MAXOBS/12/, NTRACKERS, TRACKER
C
           REAL*4       HX(12,2), HY(12,2), PX(2,2), PY(2,2), SIGMA,
        &               WX(12), WY(12), XHAT(12), YHAT(12),
        &               ZX(12), ZY(12), ZXHAT(12), ZYHAT(12)
C
C_____
C
C                       EXECUTABLE CODE
C
C_____
C
C   Initialize the trackpoint measurement variances, the number of
C   good trackers, and the standard deviation for one tracker.
C
           TPVARX = 0.0
           TPVARY = 0.0
           NTRACKERS = 0
           SIGMA = 0.5
C
C   Set the tracker mode to locked on and the breaklock flag to false.
C
           TRKMODE = 1
           BRKLCK = .FALSE.
C
C   For each good tracker at least one cycle old ...
C
       DO TRACKER = 1, MAXT
          IF (DBASE(TRACKER,1) .EQ. 2 .AND. DBASE(TRACKER,9) .GE. 1) THEN
C
C   Assign model matrices and observation vectors used to compute
C   least-squares target aimpoint and size estimates.
C
              HX(TRACKER,1)  = 1.0
              HX(TRACKER,2)  = DISTX(TRACKER)
              HY(TRACKER,1)  = 1.0
              HY(TRACKER,2)  = DISTY(TRACKER)
              ZX(TRACKER)    = DBASE(TRACKER,2) + SUBPIXX(TRACKER)
              ZY(TRACKER)    = DBASE(TRACKER,3) + SUBPIXY(TRACKER)
C
C   If selected, assign least-squares weights based on the distance of the
C   tracker from the aimpoint.
C
              IF (WEIGHTDIST) THEN
C
C
                 IF (DISTX(TRACKER) .GT. 0.1) THEN
                    WX(TRACKER) = 1.0 / DISTX(TRACKER)
                 ELSE
                    WX(TRACKER) = 10.0
                 END IF ! X normalized distance > 0.1
C
                 IF (DISTY(TRACKER) .GT. 0.1) THEN
                    WY(TRACKER) = 1.0 / DISTY(TRACKER)
                 ELSE
                    WY(TRACKER) = 10.0
                 END IF ! Y normalized distance > 0.1
C
              ELSE ! Don't assign distance weights
C
```

```
                WX(TRACKER) = 1.0
                WX(TRACKER) = 1.0
C
            END IF ! Assign distance weights
C
C   Increment the number of trackers counter.
C
C
C
C
                NTRACKERS = NTRACKERS + 1
C
C
C   Else, zero the least-squares weights for this tracker.
C
            ELSE
                WX(TRACKER) = 0.0
                WY(TRACKER) = 0.0
            END IF ! This tracker is good and at least 1 cycle old
        END DO ! For all good trackers
C
C   If there are at least two trackers ...
C
        IF (NTRACKERS .GT. 1) THEN
C
C   Use least-squares to estimate aimpoint location and target size.
C
            CALL LEASTSQ (HX, ZX, WX, XHAT, PX, ZXHAT, MAXEST, MAXOBS)
            CALL LEASTSQ (HY, ZY, WY, YHAT, PY, ZYHAT, MAXEST, MAXOBS)
C
C   Run the jitter test to delete trackers with bad measurements.
C
            DO TRACKER = 1, MAXT
                PREDX(TRACKER) = ZXHAT(TRACKER)
                PREDY(TRACKER) = ZYHAT(TRACKER)
            END DO
            CALL JITTER
C
C   Recompute the estimated trackpoint location and target size
C   after removing the bad measurements.
C
            DO TRACKER = 1, MAXT
                IF (DBASE(TRACKER,1) .EQ. -1) THEN
                    WX(TRACKER) = 0.0
                    WY(TRACKER) = 0.0
                END IF ! A tracker is not valid.
            END DO ! For all trackers
            CALL LEASTSQ (HX, ZX, WX, XHAT, PX, ZXHAT, MAXEST, MAXOBS)
            CALL LEASTSQ (HY, ZY, WY, YHAT, PY, ZYHAT, MAXEST, MAXOBS)
C
C   Compute track errors and measurement variances.
C
            RESERRX = XHAT(1) - AIMX
            RESERRY = YHAT(1) - AIMY
            TPVARX  = SIGMA**2 * PX(1,1)
            TPVARY  = SIGMA**2 * PY(1,1)
C
C   Update the aimpoint and trackpoint by adding track errors.
C
            AIMX = AIMX + RESERRX
            AIMY = AIMY + RESERRY
C
```

```
          TRACKX = TRACKX + RESERRX
          TRACKY = TRACKY + RESERRY
C
C     Save the estimated target sizes.
C
          RSIZEX = XHAT(2)
          RSIZEY = YHAT(2)
C
C     Else, if there is one tracker ...
C
      ELSE IF (NTRACKERS .GT. 0) THEN
C
C     Find the tracker measurement of the good tracker.
C
          TRACKER = 1
          DO WHILE (WX(TRACKER) .EQ. 0.0)
              TRACKER = TRACKER + 1
          END DO ! while searching for the good tracker measurement
C
C     Compute the aimpoint as the offset from the tracker.
C
          RESERRX = (ZX(TRACKER) - DISTX(TRACKER) * RSIZEX) - AIMX
          RESERRY = (ZY(TRACKER) - DISTY(TRACKER) * RSIZEY) - AIMY
          TPVARX = SIGMA**2
          TPVARY = SIGMA**2
C
          AIMX = AIMX + RESERRX
          AIMY = AIMY + RESERRY
          TRACKX = TRACKX + RESERRX
          TRACKY = TRACKY + RESERRY
C
C     Else, set the breaklock flag to true and tracker mode to rate coast.
C
      ELSE
          BRKLCK = .TRUE.
          TRKMODE = 0
      END IF ! There are any trackers
C
      RETURN
      END
C_____Section C_____
C                          Texas Instruments
C                        T I  STRICTLY PRIVATE
C                     Property of Texas Instruments ONLY
C_____
C
C     SUBROUTINE INTJITTER
C_____
C
C     NAME:  INTJITTER
C
C     FUNCTION:   Performs the integrating robust jitter test for the 2-D range
C                 independent track model.
C
C     DESCRIPTION:
C         Initialize the number of trackers to zero
C         For each good tracker at least one cycle old
C             Increment the number of trackers counters
C             Compute the difference between found and predicted
C             Save the difference in a temporary vector
C         End of loop
```

```
C        If at least 3 trackers are present then
C            Compute the median of the difference values
C            Compute the median absolute deviations of the difference values
C            For each good tracker at least one cycle old
C                Jitter value = ((Difference - Median) / MAD)**2
C                If the either jitter value > threshold then
C                    Execute routine to delete the tracker
C                    Set the appropriate reason for deletion flag to true
C                End of if
C            End of loop
C        End of if
C
C    REFERENCES:
C        None
C
C_____
C
C    CALLING SEQUENCE:
C        CALL INTJITTER
C
C    INPUTS:
C        None
C
C    OUTPUTS:
C        None
C
C    DEPENDENCIES:
C        Common Blocks
C            PROCPARMS - Processing parameters
C        Functions
C            MEDIAN - Calculates median of a vector of samples
C
C    SIDE EFFECTS:
C        None
C
C    TARGET PROCESSOR:
C        VAX 8000 series VMS 4.5, Fortran Compiler 4.5-219
C
C    HISTORY:
C        06/20/91  D. Van Rheeden Initial Release
C
C_____
C
C    Local Variables
C
C        DIFF              Differences between the found and predicted locations
C        ERROR             Vertical and horizontal errors of good trackers only
C        JITRX,JITRY       Vertical and horizontal jitter scores
C        MAD_ERROR         Median absolute deviation of track errors
C        MEDIAN_ERROR      Median of track errors
C        MINMAD            Minimum allowed median absolute deviation
C        NTRACKERS         Number of good trackers
C        NSAMPLES          Number of samples to compute median/MAD
C        THRESH            Threshold for the jitter test
C        TRKR              Tracker index (position in the databases)
C
C_____
C    Variable Declarations
C
         IMPLICIT NONE
```

```
C
      INCLUDE 'COMMON:PROCPARM.CMN'  ! Processing parameters
C
      INTEGER*2  NSAMPLES, NTRACKERS, TRKR
C
      REAL*4     DIFF(24), ERROR(24), JITRX, JITRY, MAD_ERROR,
     &           MEDIAN, MEDIAN_ERROR, MINMAD /0.5/
C
      REAL*4     THRESH(24) /0.0, 0.0,18.5,20.6,21.2,16.3,
     &                       13.7, 12.3,12.3,12.3,12.3,12.3,
     &                       12.3, 12.3,12.3,12.3,12.3,12.3,
     &                       12.3, 12.3,12.3,12.3,12.3,12.3/
C
C     REAL*4     THRESH(24) /0.0,0.0,5.0,5.0,5.0,5.0,
     &                       5.0,5.0,5.0,5.0,5.0,5.0,
     &                       5.0,5.0,5.0,5.0,5.0,5.0,
     &                       5.0,5.0,5.0,5.0,5.0,5.0/
C
      EXTERNAL   MEDIAN
C
C_____
C
C                        EXECUTABLE CODE
C
C_____
C
C     Count the number of good trackers and compute the differences between the
C     predicted and the found locations.
C
C
      NTRACKERS = 0
      DO TRKR = 1, MAXT
        IF (DBASE(TRKR,1) .EQ. 2) THEN
          NTRACKERS = NTRACKERS + 1
          DIFF (2*TRKR-1) = FLOAT(DBASE)(TRKR,2)) - PREDX(TRKR)
          DIFF (2*TRKR)   = FLOAT(DBASE(TRKR,3)) - PREDY(TRKR)
          ERROR(2*NTRACKERS-1) = DIFF(2*TRKR-1)
          ERROR(2*NTRACKERS)   = DIFF(2*TRKR)
        END IF
      END DO
      NSAMPLES = 2 * NTRACKERS
C
C     If there are at least three good trackers Then do the jitter test.
C
      IF (NSAMPLES .GE. 3) THEN
C
C     Compute the jitter median.
C
        MEDIAN_ERROR = MEDIAN (ERROR, NSAMPLES)
C
C     Compute the jitter median absolute deviation (MAD).
C
        NTRACKERS = 0
        DO TRKR = 1, MAXT
          IF (DBASE(TRKR,1) .EQ. 2) THEN
            NTRACKERS = NTRACKERS + 1
            ERROR(2*NTRACKERS-1) = ABS (DIFF(2*TRKR-1) - MEDIAN_ERROR)
            ERROR(2*NTRACKERS)   = ABS (DIFF(2*TRKR)   - MEDIAN_ERROR)
          END IF
        END DO
C
```

```
              MAD_ERROR = MAX ((MEDIAN (ERROR, NSAMPLES) / 0.6745), MINMAD)
C
C     For each good tracker compute the jitter test scores.
C
              DO TRKR = 1, MAXT
                IF (DBASE(TRKR,1) .EQ. 2 .AND. DBASE(TRKR,9) .GT. 0) THEN
                  JITRX = ((DIFF(2*TRKR-1) - MEDIAN_ERROR) / MAD_ERROR)**2
                  JITRY = ((DIFF(2*TRKR)   - MEDIAN_ERROR) / MAD_ERROR)**2
C
D                 WRITE (TRLUN(TRKR), *)
D                 WRITE (TRLUN(TRKR), 10) 'JITRX =', JITRX, 'JITRY =', JITRY
D  10             FORMAT(2(5X,A7,F6.2))
C
C     If the jitter scores fail, delete the tracker from the database and set the
C     reason flag. Scale the jitter values to save in integer database.
C
                  IF (JITRX .GT. THRESH(NSAMPLES) .OR.
     &                JITRY .GT. THRESH(NSAMPLES)) THEN
                    CALL DBDEL(TRKR)
                    REASONS(2,TRKR) = .TRUE.
                  END IF
C
                  DBASE(TRKR,14) = 100 * JITRX
                  DBASE(TRKR,15) = 100 * JITRY
C
                END IF ! good tracker
C
              END DO ! trkr = 1 to maxt
C
C     Else, if not enough trackers, set the jitter values to zero
C
            ELSE
              DO TRKR = 1, MAXT
                IF (DBASE(TRKR,1) .EQ. 2) THEN
                  DBASE(TRKR,14) = 0
                  DBASE(TRKR,15) = 0
D                 WRITE (TRLUN(TRKR), *)
D                 WRITE (TRLUN(TRKR), *) 'JITRX = 0.0JITRY = 0.0'
                END IF ! existing tracker
              END DO ! i = 1, maxt
C
            END IF ! ntrackers >= 3
C
            RETURN
            END
                                Section D
```

```
C_____
C
C                        Texas Instruments
C                       TI INTERNAL DATA
C                   Property of Texas Instruments ONLY
C_____
C
C     NAME:     JITTER
C
C     FUNCTION:    Performs the robust jitter test
C
C     DESCRIPTION:
C        Initialize the number of trackers to zero
C        For each good tracker at least one cycle old
```

```
C           Increment the number of trackers counters
C           Compute the difference between found and predicted
C           Save the difference in a temporary vector
C       End of loop
C
C       If at least 3 trackers are present then
C           Compute the median of the difference values
C           Compute the median absolute deviation of the difference values
C           For each good tracker at least one cycle old
C               Jitter value = (Difference - Median)**2 / MAD **2
C               If the either jitter value > threshold then
C                   Execute routine to delete the tracker
C                   Set the appropriate reason for deletion flag to true
C               End of if
C           End of loop
C       End of if
C
C   REFERENCES:
C       None
C
C
C
C   CALLING SEQUENCE:
C       CALL JITTER
C
C   INPUTS:
C       None
C
C   OUTPUTS:
C       None
C
C   DEPENDENCIES:
C       Common Blocks
C           PROCPARMS - Processing parameters
C       Functions
C           MEDIAN - Calculates median of a vector of samples
C
C   SIDE EFFECTS:
C       None
C
C   TARGET PROCESSOR:
C       VAX 8000 series VMS 4.5, Fortran Compiler 4.5-219
C
C   HISTORY:
C       11/03/88 R. Broussard Initial Release
C       01/28/91 D. Van Rheeden Replaced mean and standard deviation with median
C                               and median abs deviation
C
C
C
C   Local Variables
C
C       NTRACKERS           Number of good trackers
C       DIFFX, DIFFY        Differences between the found and predicted locations
C       ERRX, ERRY          Vertical and horizontal errors of good trackers only
C       JITRX, JITRY        Vertical and horizontal jitter scores
C       MADX, MADY          Median absolute deviation of X and Y track errors
C       MEDIANX, MEDIANY    Median of X and Y track errors
C       MINMAD              Minimum allowed median absolute deviation
C       THRESH              Threshold for the jitter test
C       TRKR                Tracker index (position in the database)
```

```fortran
C
C
C
C      Variable Declarations
C
       IMPLICIT NONE
C
       INCLUDE 'COMMON:PROCPARM.CMN' ! Processing parameters
C
       INTEGER*2  NTRACKERS, TRKR
C
       REAL*4     DIFFX (12), DIFFY(12), ERRX(12), ERRY(12), JITRX,
     &            JITRY, MADX, MADY, MEDIAN, MEDIANX, MEDIANY,
     &            MINMAD /0.5/
C
       REAL*4     THRESH(12) /0.0, 0.0, 18.5, 20.6, 21.2, 16.3,
     &            13.7, 12.3, 12.3, 12.3, 12.3, 12.3 /
C      REAL*4     THRESH(12) /0.0, 0.0, 5.0, 5.0, 5.0, 5.0,
C    &            5.0, 5.0, 5.0, 5.0, 5.0, 5.0 /
C
       EXTERNAL  MEDIAN
C
C
C
C                         EXECUTABLE CODE
C
C
C
C      Count the number of good trackers and compute the difference between the
C      predicted and the found locations.
C
       NTRACKERS = 0
       DO TRKR = 1, MAXT
          IF (DBASE(TRKR,1) .EQ. 2) THEN
             NTRACKERS = NTRACKERS + 1
             DIFFX(TRKR) = FLOAT (DBASE(TRKR, 2)) - PREDX(TRKR)
             DIFFY(TRKR) = FLOAT (DBASE(TRKR,3)) - PREDY(TRKR)
             ERRX (NTRACKERS) = DIFFX (TRKR)
             ERRY (NTRACKERS) = DIFFY (TRKR)
          END IF
       END DO
C
C      If there are at least three good trackers Then do the jitter test.
C
       IF (NTRACKERS .GE. 3) THEN
C
C      Compute the jitter median.
C
          MEDIANX = MEDIAN ( ERRX, NTRACKERS )
          MEDIANY = MEDIAN ( ERRY, NTRACKERS )
C
C      Compute the jitter median absolute deviation (MAD).
C
       NTRACKERS = 0
       DO TRKR = 1, MAXT
          IF (DBASE(TRKR,1) .EQ. 2) THEN
             NTRACKERS = NTRACKERS + 1
             ERRX (NTRACKERS) = ABS ( DIFFX(TRKR) - MEDIANX )
             ERRY (NTRACKERS) = ABS ( DIFFY(TRKR) - MEDIANY )
          END IF
       END DO
```

```
C
            MADX = MAX ( (MEDIAN( ERRX, NTRACKERS ) / 0.6745), MINMAD )
            MADY = MAX ( (MEDIAN( ERRY, NTRACKERS ) / 0.6745), MINMAD )
C
C    For each good tracker compute the jitter test scores.
C
            DO TRKR = 1, MAXT
                IF (DBASE(TRKR,1) .EQ. 2 .AND. DBASE (TRKR, 9) .GT. 0) THEN
                    JITRX = (DIFFX(TRKR) - MEDIANX)**2 / MADX**2
                    JITRY = (DIFFY(TRKR) - MEDIANY)**2 / MADY**2
C
D                   WRITE (TRLUN(TRKR), *)
D                   WRITE (TRLUN(TRKR), 10) 'JITRX =', JITRX, 'JITRY =', JITRY
D    10             FORMAT (2(5X,A7,F6.2))
C
C    If the jitter scores fail, delete the tracker from the database and set the
C    reason flag.  Scale the jitter values to save in integer database.
C
                    IF (JITRX .GT. THRESH (NTRACKERS) .OR.
     &                  JITRY .GT. THRESH (NTRACKERS)) THEN
                        CALL DBDEL (TRKR)
                        REASONS (2,TRKR) = .TRUE.
                    END IF
C
                    IF (JITRX .LT. (2**15-1) /100) THEN
                        DBASE (TRKR,14) = 100 * JITRX
                    ELSE
                        DBASE (TRKR,14) = (2**15-1) /100
                    END IF
C
                    IF (JITRY .LT. (2**15-1) /100) THEN
                        DBASE (TRKR, 15) = 100 * JITRY
                    ELSE
                        DBASE (TRKR,15) = (2**15-1) / 100
                    END IF
C
                END IF ! good tracker
C
            END DO ! trkr = 1 to maxt
C
C    Else, if not enough trackers, set the jitter values to zero
C
            ELSE
                DO TRKR = 1, MAXT
                    IF (DBASE (TRKR,1) .EQ. 2) THEN
                        DBASE (TRKR,14) = 0
                        DBASE (TRKR,15) = 0
D                       WRITE (TRLUN (TRKR), *)
D                       WRITE (TRLUN (TRKR), *)' JITRX = 0.0  JITRY = 0.0'
                    END IF ! existing tracker
                END DO ! i = 1, maxt
C
            END IF ! ntrackers >=3
C
            RETURN
            END
C_____Section E_____
C
C                        Texas Instruments
C                        T I  I N T E R N A L  D A T A
C                        Property of Texas Instruments ONLY
C
```

```
C
C
C              SUBROUTINE LEASTSQ (H, Z, W, XHAT, ZHAT, P, NEST, NOBS)
C
C
C
C      NAME:  LEASTSQ
C
C      FUNCTION:    Weighted least-squares estimator.  The estimator uses
C                   the standard form:
C
C
C                       x = (H^T * W * H)^{-1} * H^T * W * z
C
C          where
C              x = vector of least-squares estimates
C              z = vector of input observations
C              H = least-squares model matrix
C              W = weighting matrix
C
C          The predicted observations are computed by:
C
C
C                   z = W * H * (H^T * W * H)^{-1} * H^T * W * z
C
C      DESCRIPTION:
C
C
C          Compute the matrix product HW = H^T * W
C          Compute the matrix product HW * H and invert the result
C          Save the least-squares estimate covariance matrix
C          Compute the least-squares pseudo-inverse matrix
C          Computer the least-squares estimates
C          Compute the observation estimates
C
C      REFERENCES:
C          Elbert, T. F., Estimation and Control of Systems, Van Nostrand
C          Reinhold Co., 1984, pp. 367-369.
C
C
C
C      CALLING SEQUENCE:
C          CALL LEASTSQ (H, Z, W, XHAT, ZHAT, P, NEST, NOBS)
C
C      INPUTS:
C          H      - Least-squares model matrix
C          NEST   - Number of least-squares estimates to compute
C          NOBS   - Number of least-squares observations to compute
C          W      - Weight vector
C          Z      - Vector of observations
C
C      OUTPUTS:
C          P      - Least-squares estimate normalized covariance matrix
C          XHAT   - Vector of least-squares estimates
C          ZHAT   - Vector of predicted observations
C
C      DEPENDENCIES:
C        Subroutines
C          MATINV   - Inverts a matrix
C          MATMULT  - Multiplies two matrices
C          MATTRAN  - Transposes a matrix
```

```
C          MVMULT - Multiplies a matrix by a column vector
C
C     SIDE EFFECTS:
C          If the number of estimates or the number of observations become
C          larger than the local matrix dimensions, then the local matrix
C          dimensions must be increased.
C
C     TARGET PROCESSOR:
C          VAX 8000 series VMS 4.5, Fortran Compiler 4.5-219
C
C     HISTORY:
C          05/30/91   D. Van Rheeden Initial Release
C
C_____
C
C     Local Variables
C
C          I, J       Matrix loop indexes
C          HTW        Product of transposed model matrix and weights
C          HTWHINV    Inverse of the product HTW * H
C          OBS        Observation estimate model matrix
C          PSINV      Least-squares pseudo-inverse matrix
C          WTH        Transpose of the product HTW
C
C_____
C
C     Variable Declarations
C
      IMPLICIT NONE
C
      INCLUDE 'COMMON:PROCPARM.CMN' ! Processing parameters
C
      INTEGER*2  I, J, NEST, NOBS
C
      REAL*4     H(NOBS,NEST), HTW(3,24), HTWH(3,3),
     &           OBS(24,24), P(NEST,NEST), PSINV(3,24),
     &           TEMP(3,3), W(NOBS), XHAT(NEST), WTH(24,3),
     &           Z(NOBS), ZHAT(NOBS)
C
C_____
C
C                    EXECUTABLE CODE
C
C_____
C
C     Compute the matrix product HW = H^T * W. Note that W is input as a
C     vector instead of a matrix to reduce the number of computations.
C
      CALL MATTRAN (H, HTW, NOBS, NEST)
      DO = 1, NEST
        DO J = 1, NOBS
          HTW(I,J) = W(J) * HTW(I,J)
        END DO
      END DO
C
C     Compute the matrix product H^T * W * H and invert. Save the result as
C     the normalized covariance matrix of the least-squares estimates.
C
      CALL MATMULT (HTW, H, HTWH, NEST, NOBS, NOBS, NEST)
      CALL MATINV (HTWH, P, TEMP, NEST, NEST)
```

```
C
C     Compute the least-squares pseudo-inverse matrix.
C
      CALL MATMULT (P, HTW, PSINV, NEST, NEST, NEST, NOBS)
C
C     Compute the least-squares estimates, x.
C
      CALL MVMULT (PSINV, Z, XHAT, NEST, NOBS, NOBS)
C
C     Compute the observation estimates, z.
C
      CALL MATTRAN (HTW, WTH, NEST, NOBS)
      CALL MATMULT (WTH, PSINV, OBS, NOBS, NEST, NEST, NOBS)
      CALL MVMULT (OBS, Z, ZHAT, NOBS, NOBS, NOBS)
C
      RETURN
      END C                          Section F
C_____
C                        Texas Instruments
C                         T I INTERNAL DATA
C                    Property of Texas Instruments ONLY
C_____
C
C     COMMON BLOCK TKPTPARM
C
C
C     MNEUMONIC:  TRacKPoinT measurement PARaMeters common block
C
C     AUTHOR:     Don Van Rheeden
C
C     HISTORY:
C     01/09/91    D. Van Rheeden Initial release
C
C
C                      VARIABLE DECLARATIONS
C
C
          COMMON TKPTPARMS/ AMOUNT_SHIFTED, BIAS_COUNT,
       &  BIAS_INTERVAL,
       &  BIASX, BIASY, COMPUTE_SUBPIX, DISP_UPPER,
       &  DISTX, DISTY, DIST2DX, DIST2DY,
       &  INITSIZEX, INITSIZEY, MAGNIFY, MAGVAR,
       &  MODEL, OFFSETX, OFFSETY, RANGEIND,
       &  RECEMTERP, RECENERY, SAVED LOSP,
       &  SUBPIXX, SUBPIXY, TRKMODE, WEIGHTDIST/
C
          INTEGER *2  BIAS COUNT INITSIZEX, INITSIZEY, MODEL,
       &              RECENTERX, RECENTERY, TRKMODE
C
          REAL *4     AMOUNT_SHIFTED, BIAS_INTERVAL, BIASX,
       &              BIASY, DISP_CORR, DISP_UPPER, DISTX(12),
       &              DISTY (12), DIST2DX(12), DIST2DY(12), MAGNIFY,
       &              MAGVAR, OFFSETX, OFFSETY, SAVED_LOSP,
       &              SUBPIXX(12), SUBPIXY(12)
C
          LOGICAL*2   COMPUTE_SUBPIX, RANGEIND, WEIGHTDIST
C
C                      VARIABLE DESCRIPTIONS
```

```
C
C       AMOUNT_SHIFTED  Number of meters shifted on target by aimpoint bias
C       BIAS_COUNT      Aimpoint bias counter
C       BIAS_INTERVAL   Number of seconds between aimpoint biases
C       BIAS X, Y       Aimpoint biasing weights:
C                          BIASX=0.0 -bias left BIASY=0.0 -bias down
C                          BIASX=0.5 -no bias   BIASY=0.5 -no bias
C                          BIASX=1.0 -bias right BIASY=1.0 -bias up
C       COMPUTE_SUBPIX  Compute subpixel esteimate flag
C       DIST2DX,Y       Distances normalized by 2-D magnification
C       INITSIZEX,Y     Target size at tracker initialization
C       MAGNIFY         Estimated magnifications factor
C       MAGVAR          Variance of the magnification factor estimate
C       MODEL           Range independent tracking model:
C                          1- 1-D Model (X & Y estimated independently)
C                          2- 2-D Model (X & Y estimated simultaneously)
C       OFFSETX,Y       Offset of aimpoint from trackpoint
C       RANGEIND        Range independent tracking flag
C       RECENTERP, Y    Aimpoint recenter values (PITCH, YAW)
C       SAVED_LOSP      Line-of-sight pitchsaved from last aimpoint bias
C       SUBPIXX,Y       Trackpoint subpixel shift estimates
C       TRKMODE         Integer tracker mode:
C                          0 - rate coast (breaklock)
C                          1 - locked on (confident track)
C       WEIGHTDIST      Flag to weight each tracker measurement by its distance from
C                       the aimpoint
C       DISP_CORR       Average displacement all correlators
C       DISP_UPPER      Average displacement of upper correlators
C       DISTX,Y         Distances from trackpoint normalized by size C_____
C                         Texas Instruments
C                         TI INTERNAL DATA
C                    Property of Texas Instruments ONLY
C_____
C
C       COMMON BLOCK PROCPARM
C
C       MNUEMONIC:  PROCessing PARaMeters common block
C
C       AUTHOR:     Roger Broussard
C
C       HISTORY:
C       10/31/88    R. Broussard   Generated from program TRACK written by
C                                  Cam Kaszas for AGB program
C       1/09/90  D. Van Rheeden    Added variables to run AAWS-M images
C       4/11/91  D. Van Rheeden    Removed oresight jutter: XTRAN, YTRAN
C       4/15/91  D. Van Rheeden    Added image dimensions: IMGROWS,
C                                  IMGCOLS
C       4/17/91  D. Van Rheeden    Added max limits; MAXACF, MAXCONT
C       4/22/91  D. Van Rheeden    Added screen limits: MINX, Y and MAXX,Y
C       5/20/91  D. Van Rheeden    Added CONTTH MIN: removed HSKIP, VSKIP
C       5/24/91  D. Van Rheeden    Added trackability/ update to REASONS
C       5/24/91  D. Van Rheeden    Added reference update age threshold
C       5/28/91  D. Van Rheeden    Added real target, noisex,
C       6/13/91  D. Van Rheeden    Added line of sight angles, LOSP, Y
C       6/17/91  D. Van Rheeden    Replaced IRRES with RAD_TO_PIX,
C                                  PIX_TO_RAD
C       6/17/91  D. Van Rheeden    Added last fram X,Y coordinates to DBASE
C
```

```
C                      VARIABLE DECLARATIONS
C
         COMMON /PROCPARMS/ACOR, AGETH, AIMX, AIMY, ALTITUDE,
     &          APMODE, BRKLCK, CCOR, CFT, CHECKS, COLOR,
     &          CONT, CONTTH,CONTTH_MIN, CYCLE, DBASE,
     &          DCHISL, DCHISU, DCREFX, DCREFY, DCSERX,
     &          DCSERY, DRANGE, FRATE, HGREFX, HGREFY,
     &          IMGCOLS, IMGGAIN, IMGROWS, LOSP, LOSY LOSRP,
     &          LOSRY, LUNN, MAXACF, MAXCONT, MAXP, MAXT,
     &          MAXX, MAXY, MINX, MINY, NZSIGMA, OLDRNG,
     &          PIX_TO_RAD, PREDX, PREDY, RAD_TO_PIX,
     &          RANGE, RANGE GOOD, REASONS, RESERRX, RESERRY,
     &          RSIZEX, RSIZEY, SR, SRTH, TGTSZX, TGTSZY, TPVARX,
     &          TPVARY, TRACKX, TRACKY, TRLUN, VELOCITY
C
         INTEGER*2 AGETH, CHECKS, CONT, CONITH, CONTTHIN, CYCLE,
     &      DBASE(12,17), DCHISL, DCHISU, DCREFX, DCREFY,
     &      DCSERX, DCSERY, HGREFX, HGREFY, IMGCOLS,
     &      IMGROWS, LUNN, MAXACF, MAXCONT, MAXP, MAXT,
     &      MAXX, MAXY, MINX, MINY, SR, SRTH, TRLUN(12)
C
         INTEGER*4 ACOR(25,25), APMODE, CCOR(25,25), COLOR(12)
C
         REAL*4  AIMX, AIMY, ALTITUDE, DRANGE, FRATE,
     &      IMGGAIN, LOSP, LOSY, LOSRP, LOSRY, NZSIGNMA,
     &      OLDRNG, PIX_TO_RAD, PREDX(12), PREDY(12),
     &      RAD_TO_PIX, RANGE, RESERRX, RESERRY, RSIZEX,
     &      RSIZEY, SUMP, SUMY, TGRSZX, TGTSZY, TPVARX,
     &      TPVARY, TRACKX, TRACKY, VELOCITY
C
         LOGICAL*2 BRKLCK, CFT/.TRUE./, RANGE_GOOD, REASONS(4,12)
C
C                      VARIABLE DESCRIPTIONS
C
C ACOR,CCOR      Auto-correlation and cross-correlation matrices
C AGETH          Reference update tracker age threshold
C AIMX, AIMY     Horizontal and vertical position of the aimpoint (0.0,0.0 in upper left)
C APMODE         Autopilot mode
C ALTITUDE       Altitude of the platform (meters)
C BRKLCK         Breaklock flag (no good tackers in database)
C CHECKS         Total number of checks allowed this cycle
C CFT            Captive flight test indicator
C COLOR          The color index used to identify trackers
C CONT, SR       Current local contrast and sharpness ratio scores
C CONTTH, SRTH   Local contract and sharpness ratio thresholds
C CONNTH_MIN     Minimum allowed local contrast threshold
C CYCLE          Track cycle number, 0 = Initialization cycle
C DBAS(j,k)      Tracker data base
C                DBASE(j,1):   -1 = slot free, 2==> slot full
C                DBASE(j,2):   X coordinate for tracker j
C                DBASE(j,3):   Y coordinate for tracker j
C                DBASE(j,4):   Local contrast score
C                DBASE(j,5):   Sharpness ratio score
C                DBASE(j,6):   Zone number
C                DBASE(j,7):   -1==> outside OSR (needs replacement)
C                              2==> in bounds
C                DBASE(j,8):   Reference update threshold
C                DBASE(j,9):   Cycles active
C                DBASE(j,10):  Cross correlation score at best match
C                DBASE(j,11):  X predicted position
C                DBASE(j,12):  Y predicted position
```

```
C                   DBASE(j,13): Reference update flag:
C                                -1 ==> reset
C                                 2 ==> set (perform reference update)
C                   DBASE(j,14): Jitter test X score
C                   DBASE(j,15): Jitter text Y score
C                   DBASE(j,16): X coordinate from last frame
C                   DBASE(j,17): Y coordinate from last frame
C DCHISL, DCHISU   Lower and upper thresholds for the local contrast histogram
C                  computation
C DCREFX, DCREFY   Horizontal and vertical size of the reference array
C DCSERX, DCSERY   Horizontal and vertical size of the search array
C DRANGE           Change in slant range between each image (meters/frame)
C FRATE            Frame rate (seconds/frame)
C HGREFX, HGREFY   Horizontal and vertical size of the reference are used
C                  to compute the local contrast
C IMGCOLS, IMGROWS Image horizontal and vertical dimensions
C IMGGAIN          Image global gain
C LOSP, LOSY       Pitch/Yaw line-of-sight angles (radians)
C LOSRP, LOSRY     Pitch/Yaw line-of-sight rates (radians/sec)
C LUNN             Logical unit number counter for tracker output
C MAXACF           Maximum number of autocorrelation function shape tests
C MAXCONT          Maximum number of local contrast tests
C MAXP             Number of parameters per tracker (==> DBASE(i,MAXP))
C MAXT             Maximum number of trackers allowed
C                  (==>DBASE(MAXT,j))
C MAXX, MAXY       Maximum horizontal and vertical search area boundaries
C MINX, MINY       Minimum horizontal and vertical search area boundaries
C NZSIGMA          Standard deviation of the image noise
C OLDRNG           Previous target range
C PIX_TO_RAD       Pixels to radians conversion factor
C PREDX, PREDY     Floating point values for predicted tracker locations
C RAD_TO_PIX       Radians to pixels conversion factor
C RANGE            Slant range (meters)
C RANGE_GOOD       Range good indicator
C REASONS          Reason flags for why tracker was deleted or updated:
C                   REASONS(1,x)- Tracker is out-of-bounds,
C                   REASONS(2,x)- Tracker failed jitter test
C                   REASONS(3,x)- Tracker failed trackability tests
C                   REASONS(4,x)- Tracker reference update occurred
C RESERRX,RESERRY  Correlation residual error (pixels)
C RSIZEX, RSIZEY   Real-value target size for limiting subimage search
C SUMP, SUMY       Pitch/ Yaw integrated line-of-sight (radians)
C TGTSZX, TGTSZY   Target size for limiting subimage search region
C TPVARX, TPVARY   Trackpoint measurement variance
C TRACKX, TRACKY   Horizontal and vertical position of the trackpoint
C                  (0.0, 0.0 in upper left)
C TRLUN            Logical unit numbers for the existing trackers
C VELOCITY         Velocity of the platform (meters/second)
C
C
C                              Section G
C_____
C                           Texas Instruments
C                           TI INTERNAL DATA
C                      Property of Texas Instruments ONLY
C_____
C
C     SUBROUTINE DBDEL (TRACKER)
C
C     NAME:    DBDEL
C
```

```
C     FUNCTION:    Deletes a tracker from the database
C
C     DESCRIPTION:
C        Set the values of the tracker location to -1
C        Compute the location of the reference subimage in B memory
C        Clear the region of B memory used for the reference subimage
C
C     REFERENCES:
C        None
C
C     CALLING SEQUENCE:
C        Call DBDEL (TRACKER)
C
C     INPUTS:
C        TRACKER - Index of tracker to delete
C
C     OUTPUTS:
C        None
C
C     DEPENDENCIES:
C        Common Blocks
C           ASPMEMYS - APAP A and B memories
C           PROCPARMS - Processing parameters
C
C     SIDE EFFECTS:
C        None
C
C     TARGET PROCESSOR:
C        VAX 8000 series VMS 4.5, Fortran Compiler 4.5 -219
C
C     HISTORY:
C        11/08/88   R. Broussard    Initial Release
C              Local Variables
C        I,J       Loop counters
C        MXSTRT    Starting column of reference subimage in B memory
C        MYSTRT    Starting row of reference subimage in B memory
C
C     Variable Declarations
C
      IMPLICIT NONE
C
      INCLUDE 'COMMON: APMEMY. CMN! '  APAP A and B memories
      INCLUDE 'COMMON:PROGPARM. CMN! '  Processing parameters
C
      INTEGER*2    I, J, MXSTRT, MYSTRT, TRACKER
C
C
C_____
                        EXECUTABLE CODE
C_____
C
C     Set the tracker indicator in the database to indicate available.
C
      DBASE( TRACKER,1) = -1
C
C     Determine the location of the tracker in B memory.
C
      MXSTRT = MOD( TRACKER-1, 8) *16 +1
      MYSTRT = (( TRACKER-1)/8 * 16 +1
C     Erase reference image and label from B memory.
```

```
C
        DO J = 1, 16
          DO I = 1, 16
            DMEMYB( MXSTRT+I-1, MYSTRT+J-1) = 0
          END DO
        END DO
C
C    For Debugging . . .
C
D       CLOSE( UNIT=TRLUN( TRACKER))
C
        RETURN
        END
```

---

C
C                         Texas Instruments
C                         TI INTERNAL DATA
C                   Property of Texas Instruments ONLY
C

---

```
        REAL*4 FUNCTION MEDIAN (VECTOR, NSAMPLES)
```

---

C    NAME:      MEDIAN
C
C    FUNCTION:   Computes the median of a vector of numbers.
C
C    DESCRIPTION:
C        Sort the input vector from smallest to largest
C        If the number of input samples is even Then
C           Median = average of two middle samples
C        Else the number of input samples is odd
C           Median = middle sample
C        End If
C
C    REFERENCES:
C        None
C

---

C    CALLING SEQUENCE:
C        MEDIAN_VALUE = MEDIAN (VECTOR, NSAMPLES)
C
C    INPUTS:
C        VECTOR   - Input vector containing samples to process
C        NSAMPLES - Number of samples in VECTOR
C
C    OUTPUTS:
C        MEDIAN - Output median value
C
C    DEPENDENCIES:
C        None
C
C    SIDE EFFECTS:
C        None
C
C    TARGET PROCESSOR:
C        VAX 8000 series VMS 4.5, Fortran Compiler 4.5-219
C

```
C     HISTORY:
C         01/28/91   D. Van Rheeden Initial Release
C         06/20/91   D. Van Rheeden Reduced outer sorting loop from N-1
C                        samples to N/2+1 samples
C
C
C_____
C
C     Local Variables
C
C         I, J        Sorting loop counters
C         MIDDLE      Address of middle value in the sorted input vector
C         TEMP        Temporary storage used by sorting loops
C
C
C_____
C
C     Variable Declarations
C
          IMPLICIT NONE
C
          INTEGER*2  I, J, MIDDLE, NSAMPLES
C
          REAL*4     TEMP, VECTOR (NSAMPLES)
C
C_____
C
C                        EXECUTABLE CODE
C
C_____
C
C     Sort the input vector from smallest to largest values.
C
          DO I = 1,NSAMPLES/2+1
            DO J = 2,NSAMPLES
              IF ( VECTOR(J) .LT. VECTOR(J-1) ) THEN
                TEMP = VECTOR(J-1)
                VECTOR(J-1) = VECTOR(J)
                VECTOR(J) = TEMP
              END IF
            END DO
          END DO
C
C     Compute the median.  If the number of input samples is even, the
C     median is the average of the two middle samples.  If the number of
C     samples is odd, the median is the middle sample.
C
          IF (MOD(NSAMPLES,2) .EQ. 0) THEN
            MIDDLE = NSAMPLES/2
            MEDIAN = (VECTOR(MIDDLE) + VECTOR(MIDDLE+1)) / 2.0
          ELSE
            MIDDLE = NSAMPLES/2 + 1
            MEDIAN = VECTOR(MIDDLE)
          END IF
C
          RETURN
          END
C_____
C
C                        Texas Instruments
C                        TI INTERNAL DATA
C                   Property of Texas Instruments ONLY
C
```

```
C_____
C
C       SUBROUTINE MATADD ( M1, M2, SUM, ROWS, COLS )
C
C_____
C
C   NAME:    MATADD
C
C   FUNCTION:   Adds two matrices.
C
C   DESCRIPTION:
C       Sum = matrix #1 + matrix #2.
C
C   REFERENCES:
C
C_____
C
C   CALLING SEQUENCE:
C       CALL MATADD ( M1, M2, SUM, ROWS, COLS )
C
C   INPUTS:
C       M1, M2      - Input matrices
C       ROWS, COLS  - Matrix dimensions
C
C   OUTPUTS:
C       SUM - Output matrix sum
C
C   DEPENDENCIES:
C       None
C
C   TARGET PROCESSOR:
C       VAX 8000 series VMS 4.5, Fortran Compiler 4.5-219
C
C   HISTORY:
C       02/18/91        D. Van Rheeden   Initial Release
C
C_____
C
C   Local Variables
C
C       I, J    Matrix indexes
C
C_____
C
C   Variable Declarations
C
        IMPLICIT NONE
C
        INTEGER*2   COLS, I, J, ROWS
C
        REAL*4      M1(ROWS,COLS), M2(ROWS,COLS),
     &              SUM(ROWS,COLS)
C
C_____
C
C                       EXECUTABLE CODE
C
C_____
C
C   Add the two input matrices.
```

```
C
        DO I = 1, ROWS
         DO J = 1, COLS
          SUM(I,J) = M1(I,J) + M2(I,J)
         END DO
        END DO
C
        RETURN
        END
C
C
C_____
C
        SUBROUTINE MATSUB ( M1, M2, DIFF, ROWS, COLS )
C
C_____
C
C   NAME:     MATSUB
C
C   FUNCTION: Subtracts two matrices.
C
C   DESCRIPTION:
C       Difference = matrix #1 - matrix #2.
C
C   REFERENCES:
C
C_____
C
C   CALLING SEQUENCE:
C       CALL MATSUB ( M1, M2, DIFF, ROWS, COLS )
C
C   INPUTS:
C       M1, M2 -    Input matrices
C       ROWS, COLS -   Matrix dimensions
C
C   OUTPUTS:
C       DIFF - Output matrix difference
C
C   DEPENDENCIES:
C       None
C
C   SIDE EFFECTS:
C       None
C
C   TARGET PROCESSOR:
C       VAX 8000 series VMS 4.5, Fortran Compiler 4.5-219
C
C   HISTORY:
C       02/18/91    D. Van Rheeden  Initial Release
C
C_____
C
C   Local Variables
C
C       I, J    Matrix indexes
C
C_____
C
C   Variable Declarations
C
```

```
      IMPLICIT NONE
C
      INTEGER*2   COLS, I, J, ROWS
C
      REAL*4      M1(ROWS,COLS), M2(ROWS,COLS), DIFF(ROWS,COLS)
C
C_____
C
C                         EXECUTABLE CODE
C
C_____
C
C     Subtract the two input matrices.
C
      DO I = 1, ROWS
        DO J = 1, COLS
          DIFF(I,J) = M1(I,J) + M2(I,J)
        END DO
      END DO
C
      RETURN
      END
C
C
C_____
C
      SUBROUTINE MATMULT ( M1, M2, PROD, ROW1, COL1, ROW2, COL2 )
C
C_____
C
C   NAME:     MATMULT
C
C   FUNCTION:    Multiplies two matrices.
C
C   DESCRIPTION:
C       If inner matrix dimensions do not match Then
C         Write status message to the user.
C         Exit from the program.
C       End if inner matrix dimensions do not match.
C       Product = matrix #1 * matrix #2.
C
C   REFERENCES:
C
C_____
C
C   CALLING SEQUENCE:
C       CALL MATMULT ( M1, M2, PROD, ROW1, COL1, ROW2, COL2 )
C
C   INPUTS:
C       M1, M2       - Input matrices
C       ROW1, COL1   - Input matrix M1 dimensions
C       ROW2, COL2   - Input matrix M2 dimensions
C
C   OUTPUTS:
C       PROD - Output matrix product
C
C   DEPENDENCIES:
C       EXIT - System exit routine
C
C   SIDE EFFECTS:
C       None
```

```
C
C     TARGET PROCESSOR:
C         VAX 8000 series VMS 4.5, Fortran Compiler 4.5-219
C
C     HISTORY:
C         02/18/91    D. Van Rheeden    Initial Release
C
C_____

C
C     Local Variables
C
C         I, J, K    Matrix indexes
C         SUM        Product accumulator
C
C_____

C
C     Variable Declarations
C
      IMPLICIT NONE
C
      INTEGER*2  COL1, COL2, I, J, K, ROW1, ROW2
C
      REAL*4     M1(ROW1,COL1), M2(ROW2,COL2), PROD(ROW1,COL2),
     &           SUM
C
C_____

C
C                    EXECUTABLE CODE
C
C_____

C
C     If the inner matrix dimensions do not agree, write a status message
C     and exit the program.
C
      IF ( COL1 .NE. ROW2 ) THEN
         WRITE(6,*) ' Error in MATMULT'
     &              ' Inner matrix dimensions do not agree.'
         CALL EXIT (0)
      END IF
C
C     Multiply the two input matrices.
C
      DO I = 1, ROW1
        DO J = 1, COL2
          SUM = 0.0
          DO K = 1, COL1
            SUM = SUM + M1(I,K) * M2(K,J)
          END DO
          PROD(I,J) = SUM
        END DO
      END DO
C
      RETURN
      END
C
C
C_____
C
      SUBROUTINE MATCOPY ( M, COPY, ROWS, COLS )
C
```

```
C_____
C
C      NAME:     MATCOPY
C
C      FUNCTION:   Copies a matrix.
C
C      DESCRIPTION:
C           Copy the input matrix to the output matrix.
C
C      REFERENCES:
C
C_____
C
C      CALLING SEQUENCE:
C           CALL MATCOPY ( M, COPY, ROWS, COLS )
C
C      INPUTS:
C           M      - Input matrix
C           ROWS, COLS - Matrix dimensions
C
C      OUTPUTS:
C           COPY - Copy of the input matrix
C
C      DEPENDENCIES:
C           None
C
C      SIDE EFFECTS:
C           None
C
C      TARGET PROCESSOR:
C           VAX 8000 series VMS 4.5, Fortran Compiler 4.5-219
C
C      HISTORY:
C           02/18/91   D. Van Rheeden      Initial Release
C
C_____
C
C      Local Variables
C
C           I, J      Matrix indexes
C
C_____
C
C      Variable Declarations
C
       IMPLICIT NONE
C
       INTEGER*2   COLS, I, J, ROWS
C
       REAL*4      M(ROWS,COLS), COPY(ROWS,COLS)
C
C_____
C
C                       EXECUTABLE CODE
C
C_____
C
C      Copy the input matrix into the output matrix.
C
           DO I = 1, ROWS
           DO J = 1, COLS
```

```
            COPY(I,J) = M(I,J)
          END DO
        END DO
C
C
        RETURN
        END
C
C
C_____
C
        SUBROUTINE MATTRAN ( M, TRANS, ROWS, COLS )
C
C_____
C
C
C     NAME:        MATTRAN
C
C     FUNCTION:    Transposes a matrix.
C
C     DESCRIPTION: Transpose the input matrix.
C
C     REFERENCES:
C
C
C_____
C
C     CALLING SEQUENCE:
C         CALL MATTRAN ( M, TRANS, ROWS, COLS )
C
C     INPUTS:
C         M              - Input matrix
C         ROWS, COLS     - Matrix dimensions
C
C     OUTPUTS:
C         TRANS - Output matrix difference
C
C     DEPENDENCIES:
C         None
C
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden   Initial Release
C
C_____
C
C     Local Variables
C
C         I, J    Matrix indexes
C
C_____
C
C     Variable Declarations
C
        IMPLICIT NONE
C
        INTEGER*2  COLS, I, J, ROWS
```

```
C
      REAL*4    M(ROWS,COLS), TRANS(ROWS,COLS)
C
C_____
C
C                    EXECUTABLE CODE
C
C_____
C
C     Transpose the input matrix.
C
      DO I = 1, ROWS
        DO J = 1, COLS
          TRANS(J,I) = M(I,J)
        END DO
      END DO
C
      RETURN
      END
C
C
C_____
C
      SUBROUTINE MATDET ( M, DET, WORK, ROWS, COLS )
C
C_____
C
C     NAME:        MATDET
C
C     FUNCTION:    Computes the determinant of a square matrix.
C
C     DESCRIPTION:
C          If the input matrix is not square Then
C             Write status message to the user.
C             Exit from the program.
C          End if input matrix is not square.
C          Copy input matrix into temporary work array.
C          Decompose the matrix into lower/upper (LU) form.
C          Determinant = product of LU matrix diagonal elements.
C
C     REFERENCES:
C
C_____
C
C     CALLING SEQUENCE:
C          CALL MATDET ( M, DET, WORK, ROWS, COLS )
C
C     INPUTS:
C          M          - Input matrix
C          ROWS, COLS - Matrix dimensions
C
C          WORK       - Temporary work array
C
C     OUTPUTS:
C          DET - Output matrix determinant
C
C     DEPENDENCIES:
C          EXIT        - System exit routine
C          MATLUD      - Lower/Upper (LU) matrix decomposition
C
```

```
C    SIDE EFFECTS:
C        A copy should be made of the input matrix unless the user
C        desires to use the LU decomposed matrix.
C
C    TARGET PROCESSOR:
C        VAX 8000 series VMS 4.5, Fortran Compiler 4.5-219
C
C    HISTORY:
C        02/18/91   D. Van Rheeden   Initial Release
C
C_____
C
C    Local Variables
C
C        L J      Matrix indexes
C        INDX     LU decomposition backsubstitution index vector
C
C_____
C
C    Variable Declarations
C
      IMPLICIT NONE
C
      INTEGER*2    COLS, I, INDX(50), J, ROWS
C
      REAL*4       DET, M(ROWS,COLS), WORK(ROWS,COLS)
C
C_____
C
C                    EXECUTABLE CODE
C
C_____
C
C    If the input matrix is not square then write a status message and
C    exit the program.
C
      IF ( ROWS .NE. COLS ) THEN
         WRITE (6,*) ' Error in MATDET ... ',
     &   ' Cannot compute determinant of a 'nonsquare matrix. '
         CALL EXIT (0)
      END IF
C
C    Copy input matrix into temporary work array.
C
      CALL MATCOPY ( M, WORK, ROWS, COLS)
C
C    Decompose the input matrix into lower/upper (LU) form.
C
      CALL MATLUD ( WORK, ROWS, COLS, INDX, DET )
C
C    Compute determinant as the product of the diagonal elements of
C    the LU decomposed matrix.  The return value DET from MATLUD
C    determines the sign of the determinant.
C
      DO J = 1, ROWS
         DET = DET + WORK(J,J)
      END DO
C
      RETURN
      END
```

```
C
C_____
C
              SUBROUTINE MATINV ( M, INV, WORK, ROWS, COLS)
C
C_____
C
C     NAME:        MATINV
C
C     FUNCTION:    Inverts a square matrix.
C
C     DESCRIPTION:
C          If the input matrix is not square Then
C             Write status message to the user.
C             Exit from the program.
C          End if input matrix into the work array.
C          Copy input matrix into the work array.
C          Decompose the matrix into lower/upper (LU) form.
C          Do backsubstitution of the LU decomposed matrix one row
C             at a time.
C
C     REFERENCES:
C
C_____
C
C     CALLING SEQUENCE:
C          CALL MATINV ( M, INV, WORK, ROWS, COLS )
C
C     INPUTS:
C
C          M            - Input matrix
C          ROWS, COLS   - Matrix dimensions
C          WORK         - Temporary work space matrix
C
C     OUTPUTS:
C
C          M            - LU decomposition of the input matrix
C          INV          - Output inverse matrix
C
C     DEPENDENCIES:
C          EXIT         - System exit routine
C          MATLUB       - Lower/Upper (LU) matrix backsubstitution
C          MATLUD       - Lower/Upper (LU) matrix decomposition
C
C     SIDE EFFECTS:
C          None
C
C     TARGET PROCESSOR:
C          VAX 8000 series VMS 4.5, Fortran Compiler 4.5-219
C
C     HISTORY:
C
C          02/18/91    D. Van Rheeden   Initial Release
C
C_____
C
C_____
C
C     Local Variables
C
C          L, J         Matrix indexes
```

```
C        INDX          LU decomposition backsubstitution index vector
C        SIGN          LU decomposition return sign
C        V             LU backsubstitution solution vector
C
C_____
C
C     Variable Declarations
C
         IMPLICIT NONE
C
         INTEGER*2   COLS, I, INDX(50), J, ROWS
C
         REAL*4      INV(ROWS,COLS), M(ROWS,COLS), SIGN, V(50),
       &             WORK(ROWS,COLS)
C
C_____
C                                                                    *
C                    EXECUTABLE CODE                                  *
C                                                                    *
C_____
C
C     If the input matrix is not square then write a status message and
C     exit the program.
C
         IF ( ROWS .NE. COLS ) THEN
           WRITE(6,*) ' Error in MATINV...',
         ' Cannot invert a nonsquare matrix. '
           CALL EXIT (0)
         END IF
C
C     Copy input matrix into the work array.
C
         CALL MATCOPY ( M, WORK, ROWS, COLS, )
C
C     Decompose the input matrix into lower/upper (LU) form.
C
         CALL MATLUD ( WORK, ROWS, COLS, INDX, SIGN )
C
C     Perform backsubstitution of the LU decomposed matrix one row
C     at a time.
C
         DO J = 1, COLS
           DO I = 1, ROWS
             V(I) = 0
           END DO
           V(J) = 1.0
           CALL MATLUB ( WORK, ROWS, COLS, INDX, V )
           DO I = 1, ROWS
             INV(I,J) = V(I)
           END DO
         END DO
C
         RETURN
         END
C
C_____
C
         SUBROUTINE MATLUD ( M, ROWS, COLS, INDX, SIGN)
C
C_____
C
```

```
C     NAME:    MATLUD
C
C     FUNCTION:   Matrix Lower/Upper (LU) decomposition.
C
C     DESCRIPTION:
C         If the input matrix is not square Then
C             Write status message to the user.
C             Exit from the program.
C         End if input matrix is not square.
C         Decompose the matrix into lower/upper (LU) form.
C
C     REFERENCES:
C
C
C_____
C
C     CALLING SEQUENCE:
C         CALL MATLUD ( M, ROWS, COLS, INDX, SIGN )
C
C     INPUTS:
C
C         M           - Input matrix
C         ROWS, COLS  - Matrix dimensions
C
C     OUTPUTS:
C
C         M           - LU decomposition of the input matrix
C         INDX        - Backsubstitution index vector
C         SIGN        - LU decomposition return sign (+-1)
C
C     DEPENDENCIES:
C         EXIT        - System exit routine
C
C     SIDE EFFECTS:
C         None
C
C     TARGET PROCESSOR:
C         VAX 8000 series VMS 4.5, Fortran Compiler 4.5-219
C
C     HISTORY:
C
C         02/18/91   D. Van Rheeden    Initial Release
C
C_____
C
C     Local Variables
C
C         BIG    Input matrix element with largest magnitude
C         DUM    Dummy argument used for temporary storage
C         I, J, K  Matrix loop indexes
C         IMAX   Decomposition index values saved in INDX vector
C         SUM    Intermediate sum
C         TINY   Small number used to prevent divides by zero
C         VV     Pivot vector
C
C_____
C
C     Variable Declarations
C
          IMPLICIT NONE
C
          INTEGER*2  COLS, I, IMAX, INDX(50), J, K, ROWS
```

```fortran
C
      REAL*4  BIG, DUM, M(ROWS,COLS), SIGN, SUM, TINY/1.0e-20/, VV(50)
C
C_____
C                                                               *
C              EXECUTABLE CODE                                   *
C                                                               *
C_____
C
C   If the input matrix is not square then write a status message and
C   exit the program.
C
      IF ( ROWS .NE. COLS ) THEN
         WRITE(6,*) ' Error in MATLUD...',
     &              ' Cannot decompose a nonsquare matrix. '
         CALL EXIT (0)
      END IF
C
C   Decompose the input matrix into lower/upper (LU) form.
C
      SIGN = 1.0
C
      DO I = 1, ROWS
        BIG = 0.0
        DO J = 1, COLS
          IF ( ABS( M(I,J) ) .GT. BIG) BIG = ABS( M(I,J) )
        END DO
        IF (BIG .EQ. 0.0) THEN
           WRITE(6,*) ' Error in MATLUD...',
     &                ' Matrix is singular.'
           CALL EXIT (0)
        END IF
        VV(I) = 1.0 / BIG
      END DO
C
      DO J = 1, ROWS
        IF (J .GT. 1) THEN
          DO I = 1, J-1
            SUM - M(I,J)
            IF (I .GT. 1) THEN
              DO K = 1, I-1
                SUM = SUM - M(I,K) + M(K,J)
              END DO
              M(I,J) = SUM
            END IF
          END DO
        END IF
C
        BIG = 0.0
C
        DO I = J, ROWS
C
          SUM = M(I,J)
C
        IF (J .GT. 1) THEN
          DO K = 1, J-1
            SUM = SUM - M(I,K) + M(K+J)
          END DO
          M(I,J) = SUM
        END IF
```

```
C
            DUM = VV(I) * ABS(SUM)
C
         IF (DUM .GT. BIG) THEN
            BIG = DUM
            IMAX = I
         END IF
      END DO
C
      IF (J .NE. IMAX) THEN
         DO K = 1, ROWS
            DUM = M(IMAX,K)
            M(IMAX,K) = M(J,K)
            M(J,K) = DUM
         END DO
         SIGN = -SIGN
         VV(IMAX) = VV(J)
      END IF
C
      INDX(J) = IMAX
C
      IF ( J .LT. COLS ) THEN
         IF ( M(J,J) .EQ. 0.0 ) M(J,J) = TINY
         DUM - 1.0 / M(J,J)
         DO I = J+1, ROWS
            M(I,J) = M(I,J) * DUM
         END DO
      END IF
C
   END DO
C
   IF    ( M(ROWS,COLS) .EQ. 0.0 ) M(ROWS,COLS) = TINY
C
   RETURN
   END
C
C_____
C
      SUBROUTINE MATLUB ( M, ROWS, COLS, INDX, BCK )
C
C_____
C
C   NAME:    MATLUB
C
C   FUNCTION:  Lower/Upper (LU) decomposed matrix backsubstitution
C
C   DESCRIPTION:
C         If the input matrix is not square Then
C            Write status message to the user.
C            Exit from the program.
C         End if input matrix is not square.
C         Perform the backsubstitution.
C
C   REFERENCES:
C
C
C
C_____
C
C   CALLING SEQUENCE:
C         CALL MATLUB ( M, ROWS, COLS, INDX, BCK )
C
```

```
C     INPUTS:
C
C        M            - Input matrix
C        ROWS, COLS   - Matrix dimensions
C
C     OUTPUTS:
C
C        M            - LU decomposition of the input matrix
C        INDX         - Backsubstitution index vector
C        BCK          - Backsubstitution vector for current row
C
C     DEPENDENCIES:
C        EXIT         - System exit routine
C
C     SIDE EFFECTS:
C        The input matrix must be an LU decomposed matrix.
C
C     TARGET PROCESSOR:
C        VAX 8000 series VMS 4.5, Fortran Compiler 4.5-219
C
C     HISTORY:
C        02/18/91   D. Van Rheeden   Initial Release
C
C_____
C
C     Local Variables
C
C        I, J    Matrix/vector indexes
C        II      Nonzero backsubstitution sum index
C        IP      Pointer into the INDX vector
C        SUM     Intermediate sum
C
C_____
C
C     Variable Declarations
C
      IMPLICIT NONE
C
      INTEGER*2  COLS, I, II, IP, INDX(50), J, ROWS
C
      REAL*4     BCK(50), M(ROWS,COLS), SUM
C
C_____
C
C             EXECUTABLE CODE
C
C_____
C
C     If the input matrix is not square then write a status message and
C     exit the program.

IF ( ROWS .NE. COLS ) THEN
         WRITE (6,*) ' Error in MATLUB... ',
     &   ' Cannot do backsubstitution on a nonsquare matrix. '
         CALL EXIT (0)
      END IF
C
C     Perform the backsubstitution.
C
      II = 0
```

```
        DO I = 1, ROWS
          IP = INDX(I)
          SUM = BCK(IP)
          BCK(IP) = BCK(I)
          IF ( II .NE. 0 ) THEN
            DO J. = II, I-1
              SUM = SUM - M(I,J) * BCK(J)
            END DO
          ELSE IF ( SUM .NE. 0.0 ) THEN
            II = I
          END IF
          BCK(I) = SUM
        END DO
C
        DO I = ROWS, 1, -1
          SUM = BCK(I)
          IF ( I .LT. ROWS ) THEN
            DO J = I+1, COLS
              SUM = SUM - M(I,J) * BCK(J)
            END DO
          END IF
          BCK(I) = SUM / M(I,I)
        END DO
C
        RETURN
        END
```

```
C_____*
C                                                      *
C              Texas Instruments                        *
C              TI INTERNAL DATA                         *
C          Property of Texas Instruments ONLY           *
C_____
C
        SUBROUTINE VECADD ( V1, V2, SUM, COLS )
C
C_____
C
C   NAME:  VECADD
C
C   FUNCTION:    Adds two vectors.
C
C   DESCRIPTION:
C        Sum = vector #1 + vector #2.
C
C   REFERENCES:
C
C_____
C
C   CALLING SEQUENCE:
C        CALL VECADD ( V1, V2, SUM, COLS )
C
C   INPUTS:
C        V1, V2  - Input vectors
C        COLS    - Vector dimensions
C
C   OUTPUTS
C        SUM     - Output vector sum
C
C   DEPENDENCIES:
C        None
```

```
C
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden   Initial Release
C
C_____
C
C     Local Variables
C
C         I   -       Vector index
C
C_____
C
C     Variable Declarations
C
      IMPLICIT NONE
C
      INTEGER*2    COLS, I
C
      REAL*4       V1(COLS), V2(COLS), SUM(COLS)
C_____
C
C                    EXECUTABLE CODE                           *
C                                                              *
C_____
C
C     Add the two input vectors.
C
      DO I = 1, COLS
        SUM(I) = V1(I) + V2(I)
      END DO
C
      RETURN
      END
C
C_____
C
      SUBROUTINE VECSUB ( V1, V2, DIFF, COLS )
C
C_____
C
C     NAME:      VECSUB
C
C     FUNCTION:    Subtracts two vectors.
C
C     DESCRIPTION:
C         Difference = vector #1 - vector #2.
C
C     REFERENCES:
C
C_____
C
C     CALLING SEQUENCE:
C         CALL VECSUB ( V1, V2, DIFF, COLS)
C
```

```
C     INPUTS:
C           V1, V2  - Input vectors
C           COLS    - Vector dimensions
C
C     OUTPUTS:
C           DIFF    - Output vector difference C     DEPENDENCIES:
C           None
C
C     SIDE EFFECTS:
C           None
C
C     TARGET PROCESSOR:
C           VAX 8000 series VMS 4.5, Fortran Compiler 4.5-219C
C
C     HISTORY:
C           02/18/91   D. Van Rheeden   Initial Release
C
C     Local Variables
C
C                 Vector index
C
C_____
C
C     Variable Declarations
C
      IMPLICIT NONE
C
      INTEGER*2       COLS, I
C
      REAL*4        V1(COLS), V2(COLS), DIFF(COLS)
C_____
C
C                   EXECUTABLE CODE                              *
C                                                                *
C_____
C
C     Subtract the two input vectors.
C
          DO I = 1, COLS
            DIFF(I) = V1(I) - V2(I)
          END DO
C
          RETURN
          END
C
C_____
C
          SUBROUTINE VECMULT ( V1, V2, PROD, COL1, COL2 )
C
C_____

C     NAME:    VECMULT
C
C     FUNCTION:     Multiplies two vectors to give the inner product.

C     DESCRIPTION:
C           If inner vector dimensions do not match Then
C              Write status message to the user.
C              Exit from the program.
```

```
C         End if inner vector dimensions do not match.
C         Inner product = vector #1 (transposed) * vector #2.
C
C   REFERENCES:
C
C_____
C
C   CALLING SEQUENCE:
C         CALL VECMULT ( V1, V2, PROD, COL1, COL2)
C
C   INPUTS:
C         V1, V2  - Input vectors
C         COL1    - Input vector V1 dimensions
C         COL2    - Input vector V2 dimensions
C
C   OUTPUTS:
C         PROD    - Output vector inner product
C
C   DEPENDENCIES:
C         EXIT    - System exit routine
C
C   SIDE EFFECTS:
C         None
C
C   TARGET PROCESSOR:
C         VAX 8000 series VMS 4.5, Fortran Compiler 4.5-219
C
C   HISTORY:
C         02/18/91  D. Van Rheeden   Initial Release
C
C_____
C
C   Local Variables
C
C         I          Vector index
C
C_____
C
C   Variable Declarations
C
      IMPLICIT NONE
C
      INTEGER*2   COL1, COL2, I
C
      REAL*4      V1(COL1), V2(COL2), PROD
C
C_____
C
C                    EXECUTABLE CODE
C
C_____
C
C If the vector dimensions do not agree, write a status message
C and exit the program.
C
      IF ( COL1 .NE. COL2 ) THEN
         WRITE (6,*) ' Error in VECMULT... ',
     &               ' Vector dimensions do not agree. '
         CALL EXIT (0)
      END IF
```

```
C
C     Multiply the two input vectors.
C
      PROD = 0.0
      DO I = 1, COL1
        PROD = PROD + V1(I) * V2(I)
      END DO
C
      RETURN
      END
```

C
C
C_____
C
      SUBROUTINE MVMULT ( M, V, PROD, ROW1, COL1, COL2 )
C
C_____

C     NAME:     MVMULT
C
C     FUNCTION:      Multiplies a matrix by a vector.
C
C     DESCRIPTION:
C         If matrix column dimension does not match vector
C         dimension Then
C         Write status message to the user.
C         Exit from the program.
C         End if dimensions do not match.
C         Product = matrix * vector.
C
C     REFERENCES:
C
C_____
C
C     CALLING SEQUENCE:
C         CALL MVMULT ( M, V, PROD, ROW1, COL1, COL2 )
C     INPUTS:
C         M              - Input matrix
C         V              - Input vector
C         ROW1, COL1     - Input matrix M dimensions
C         COL2           - Input vector V dimensions
C
C     OUTPUTS:
C         PROD   - Output vector = M * V
C
C     DEPENDENCIES:
C         EXIT   - System exit routine
C
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden   Initial Release
C
C_____
C
C     Local Variables
C

```
C       I, J        Matrix/vector index
C       SUM         Product accumulator
C
C_____
C
C       Variable Declarations
C
        IMPLICIT NONE
C
        INTEGER*2   COL1, COL2, I, J, ROW1
C
        REAL*4      M(ROW1,COL1), V(COL2), PROD(ROW1), SUM
C
C_____
C
C                   EXECUTABLE CODE                               *
C                                                                 *
C_____
C
C       If the matrix column dimension do not match the vector
C       dimension, write a status message and exit the program.
C
C
C
        IF ( COL1 .NE. COL2 ) THEN
           WRITE (6,*) ' Error in MVMULT... ',
     &     ' Matrix column and vector dimensions do not agree. '
           CALL EXIT (0)
        END IF
C
C       Multiply the input matrix by the input vector.
C
        DO I = 1, ROW1
           SUM = 0.0
           DO J = 1, COL1
              SUM = SUM + M(I,J) * V(J)
           END DO
           PROD(I) = SUM
        END DO
C
        RETURN
        END
C
C
C_____
C
        SUBROUTINE VMMULT ( V, M, PROD, ROW1, ROW2, COL2 )
C
C_____
C
C       NAME:    VMMULT
C
C       FUNCTION:    Multiplies a vector by a matrix.
C
C       DESCRIPTION:
C           If vector dimension does not match matrix row dimension C Then
C               Write status message to the user.
C               Exit from the program.
C           End if dimensions do not match.
C           Product = vector * matrix.
C
C       REFERENCES:
C
```

```
C
C
C     CALLING SEQUENCE:
C         CALL VMMULT ( V, M, PROD, ROW1, ROW2, COL2 )
C
C     INPUTS:
C         V              -   Input vector
C         M              -   Input matrix
C         ROW1           -   Input vector V dimension
C         ROW2, COL2     -   Input matrix M dimensions
C
C     OUTPUTS:
C         PROD   - Output vector = V^T * M
C
C     DEPENDENCIES:
C         EXIT   - System exit routine
C
C     SIDE EFFECTS:
C         None
C
C     TARGET PROCESSOR:
C         VAX 8000 series VMS 4.5, Fortran Compiler 4.5-219
C
C     HISTORY:
C         02/18/91   D. Van Rheeden   Initial Release
C
C
C     Local Variables
C
C         I, J        Matrix/vector indexes
C         SUM         Product accumulator
C
C
C     Variable Declarations
C
      IMPLICIT NONE
C
      INTEGER*2    COL2, I, J, ROW1, ROW2
C
      REAL*4       V(ROW1), M(ROW2,COL2), PROD(COL2), SUM
C
C                         EXECUTABLE CODE
C
C
C     If the vector dimension does not match the matrix row C dimension, then write a status
C     message and exit the program.
C
      IF ( ROW1 .NE. ROW2 ) THEN
          WRITE (6,*) ' Error in VMMULT... '
     &    'Vector dimension does not agree with matrix" row dimension.'
          CALL EXIT (0)
      END IF
C
C     Multiply the input vector by the input matrix.
C
      DO J = 1, COL2
          SUM = 0.0
          DO I = 1, ROW1
              SUM = SUM + V(I) * M(I,J)
          END DO
C
          PROD(J) = SUM
      END DO
C
      RETURN
      END
```

Although the present invention and its advantages have been described in detail, it should be understood that various changes, substitutions and alterations can be made herein without departing from the spirit and scope of the invention as defined by the appended claims.

What is claimed is:

1. A method for estimating the location of an aimpoint on an elongate target comprising the steps of:
   acquiring an aimpoint and a set of related subimages on an elongate target at a first time with a sensor;
   calculating the normalized distance in a first dimension $d_x$ and in a second dimension $d_y$ from each subimage to the aimpoint;
   at a second time reacquiring at least one of the subimages at an image position (x,y); and
   estimating the position of the aimpoint at an aimpoint image position $(x_A, y_A)$ wherein the position (x,y) of each subimage at the second time is related to the aimpoint position $(x_A, y_A)$ by the formulas:

$$x = x_A + M_o d_x + b d_x d_y$$

$$y = y_A + M_o d_y + b d_y^2$$

where $M_o$ b are constants determined at each periodic time.

2. The method of claim 1 wherein said estimating step further comprises the step of calculating the subsequent location of the aimpoint using a least squares technique on a matrix of normalized subimage distances.

3. The method of claim 1 wherein said selecting step further comprises the step of selecting a subimage using the criteria of subimage contrast.

4. The method of claim 1 wherein said selecting step further comprises the step of selecting a subimage using the criteria of subimage brightness.

5. A tracker for tracking the location of an aimpoint on an elongate target comprising:
   an aimpoint designator for establishing an aimpoint at an image position $(x_A, y_A)$ on an elongate target;
   a sensor for periodically acquiring a set of subimages at an image position (x,y) arbitrarily associated with the aimpoint;
   a normalized distance calculator responsive to the aimpoint designator and the sensor for calculating the distance in a first dimension $d_x$ and in a second dimension $d_y$ from each subimage of a first set of subimages from the established aimpoint;
   a processor coupled to the aimpoint designator, the sensor and the normalized distance calculator for periodically estimating the subsequent location of the aimpoint based upon the formulas:

$$x = x_A + M_o d_x + b d_x d_y$$

$$y = y_A + M_o d_y + b d_y^2$$

where $M_0$ and b are constants determined at each periodic time; and
memory for storing the normalized distances.

6. The guidance system of claim 5, further comprising a control system for moving the sensor towards each of the subsequent locations of the aimpoint.

7. A missile comprising:
   an aimpoint designator for establishing an aimpoint at an image position $(x_A, y_A)$ on an elongate target;
   a sensor for periodically acquiring a set of subimages at an image position (x,y) arbitrarily associated with the aimpoint;
   a normalized distance calculator responsive to the aimpoint designator and the sensor for calculating the distance in a first dimension $d_x$ and in a second dimension $d_y$ from each subimage of a first set of subimages from the established aimpoint:
   a processor coupled to the aimpoint designator, the sensor and the normalized distance calculator for periodically estimating the subsequent location $(x_A, y_A)$ of the aimpoint based upon the formulas:

$$x = x_A + M_o d_x + b d_x d_y$$

$$y = y_A + M_o d_y + b d_y^2$$

where $M_0$ and b are constants determined at each periodic time;
memory coupled to the processor for storing the normalized distances;
movable fins for guiding the missile responsive to the estimated aimpoints; and
a motor for propelling the missile.

* * * * *